US011548283B2

United States Patent
Munakata et al.

(10) Patent No.: US 11,548,283 B2
(45) Date of Patent: Jan. 10, 2023

(54) METHOD OF MANUFACTURING HEAD CHIP AND METHOD OF MANUFACTURING LIQUID JET HEAD

(71) Applicant: SII Printek Inc., Chiba (JP)

(72) Inventors: Suguru Munakata, Chiba (JP); Yuji Nakamura, Chiba (JP); Yuzuru Kubota, Chiba (JP); Daiki Irokawa, Chiba (JP)

(73) Assignee: SII PRINTEK INC., Chiba (JP)

( * ) Notice: Subject to any disclaimer, the term of this patent is extended or adjusted under 35 U.S.C. 154(b) by 539 days.

(21) Appl. No.: 16/670,203

(22) Filed: Oct. 31, 2019

(65) Prior Publication Data
US 2020/0147969 A1    May 14, 2020

(30) Foreign Application Priority Data
Nov. 9, 2018    (JP) .............................. JP2018-211729

(51) Int. Cl.
     *B41J 2/16*          (2006.01)
     *B23K 26/362*      (2014.01)

(52) U.S. Cl.
     CPC ........... *B41J 2/1634* (2013.01); *B23K 26/362* (2013.01); *B41J 2/1607* (2013.01); *B41J 2/1623* (2013.01)

(58) Field of Classification Search
     CPC ....... B41J 2/1634; B41J 2/1607; B41J 2/1623
     See application file for complete search history.

(56) References Cited

U.S. PATENT DOCUMENTS

| | | | | | |
|---|---|---|---|---|---|
| 6,070,310 | A | * | 6/2000 | Ito | ......................... H01L 41/338 347/68 |
| 2002/0047878 | A1 | * | 4/2002 | Akanabe | ................ B41J 2/1646 347/68 |

(Continued)

FOREIGN PATENT DOCUMENTS

| EP | 3378652 A1 | 9/2018 |
|---|---|---|
| JP | H11-078001 A | 3/1999 |

OTHER PUBLICATIONS

Extended European Search Report in Europe Application No. 19208094.3, dated Mar. 30, 2020, 11 pages.

*Primary Examiner* — Jason S Uhlenhake
(74) *Attorney, Agent, or Firm* — Crowell & Moring LLP

(57) ABSTRACT

There are provided a method of manufacturing a head chip capable of suppressing the occurrence of the failure in the process of forming the actuator plate to thereby increase the yield ratio, and a method of manufacturing a liquid jet head using the above method of manufacturing a head chip. The method of manufacturing a head chip according to an embodiment of the present disclosure is a method of manufacturing a head chip having an actuator plate adapted to apply pressure to liquid so as to jet the liquid. Forming the actuator plate includes forming a plurality of grooves on a surface of a piezoelectric substrate having one end and the other end so as to extend from the one end side toward the other end side, forming a conductive film on the surface of the piezoelectric substrate provided with the plurality of grooves, forming a laser processing area in the conductive film between the grooves adjacent to each other by performing laser processing from a start point on the one end side of the piezoelectric substrate to an end point on the other end side, and forming a surface removal area in at least a part including the start point and the end point out of the surface of the piezoelectric substrate by performing surface removal (Continued)

processing in a direction crossing the direction in which the laser processing is performed.

12 Claims, 17 Drawing Sheets

(56) References Cited

U.S. PATENT DOCUMENTS

2018/0222209 A1    8/2018  Kubota et al.
2018/0272711 A1*   9/2018  Nakayama ............. B41J 2/1634

* cited by examiner

METHOD OF MANUFACTURING HEAD CHIP AND METHOD OF MANUFACTURING LIQUID JET HEAD

RELATED APPLICATIONS

This application claims priority to Japanese Patent Application Nos. 2018-211729 filed on Nov. 9, 2018, the entire content of which is incorporated herein by reference.

BACKGROUND OF THE INVENTION

1. Field of the Invention

The present disclosure relates to a method of manufacturing a head chip and a method of manufacturing a liquid jet head.

2. Description of the Related Art

As a recording device for recording an image on a recording target medium, there has been known a liquid jet recording device equipped with a liquid jet head, and the liquid jet head includes a head chip for jetting a liquid. In the liquid jet recording device, the liquid is jetted from the head chip to the recording target medium, and thus, the image is recorded on the recording target medium.

The head chip includes an actuator plate to electrically be driven for jetting the liquid. The actuator plate is provided with, for example, a plurality of grooves, and sidewalls in the groove are provided with electrodes (see, e.g., JPH11-078001A).

On a surface of the actuator plate, there are disposed pads for coupling the electrodes and external wiring to each other.

In a method of manufacturing such a head chip, there is a possibility that the yield ratio decreases due to, for example, a failure in a process of forming the actuator plate. Therefore, it is desirable to provide a method of manufacturing the head chip capable of suppressing the occurrence of the failure in the process of forming the actuator plate to thereby increase the yield ratio, and a method of manufacturing the liquid jet head using the same.

SUMMARY OF THE INVENTION

A first method of manufacturing a head chip according to an embodiment of the present disclosure is a method of manufacturing a head chip having an actuator plate adapted to apply pressure to liquid so as to jet the liquid, the method including forming the actuator plate, the forming the actuator plate including forming a plurality of grooves on a surface of a piezoelectric substrate having one end and the other end so as to extend from the one end side toward the other end side, forming a conductive film on the surface of the piezoelectric substrate provided with the plurality of grooves; forming a laser processing area in the conductive film between the grooves adjacent to each other by performing laser processing from a start point on the one end side of the piezoelectric substrate to an end point on the other end side of the piezoelectric substrate, and forming a surface removal area in at least a part including the start point and the end point out of the surface of the piezoelectric substrate by performing surface removal processing in a direction crossing the direction in which the laser processing is performed.

A second method of manufacturing a head chip according to an embodiment of the present disclosure is a method of manufacturing a head chip having an actuator plate adapted to apply pressure to liquid so as to jet the liquid, the method including forming the actuator plate, the forming actuator plate including providing, to a surface of a piezoelectric substrate having one end and the other end, a plurality of first grooves so as to extend from the one end side toward the other end side, and a second groove which is disposed between the first grooves adjacent to each other and is shorter than the first groove, forming a conductive film on the surface of the piezoelectric substrate provided with the plurality of first grooves and the second groove, and forming a laser processing area in the conductive film on a periphery of the second groove by performing first laser processing from a start point on the periphery of the second groove so as to pass between one of the first grooves and the second groove, and surround the second groove, and then performing second laser processing to an end point different from the start point.

A method of manufacturing a liquid jet head according to an embodiment of the present disclosure includes the first or the second method of manufacturing a head chip according to an embodiment of the present disclosure.

According to the first and the second method of manufacturing head chips and the method of manufacturing a liquid jet head related to an embodiment of the present disclosure, it becomes possible to suppress the occurrence of the failure in the process of forming the actuator plate to thereby increase the yield ratio.

BRIEF DESCRIPTION OF THE DRAWINGS

FIG. 6 is a flow chart showing an example of a method of manufacturing the liquid jet head shown in FIG. 3 and so on.

DETAILED DESCRIPTION OF THE PREFERRED EMBODIMENTS

An embodiment of the present disclosure will hereinafter be described in detail with reference to the drawings. It should be noted that the description will be presented in the following order:

1. Embodiment (a method of manufacturing a liquid jet head using laser processing and surface removal processing)
2. Modified Example (an example of a method of manufacturing a liquid jet head using laser processing)
3. Other Modified Examples

1. Liquid Jet Recording Device (Head Chip and Liquid Jet Head)

A liquid jet recording device according to an embodiment of the present disclosure will be described.

It should be noted that each of the head chip and the liquid jet head according to the embodiment of the present disclosure is a part of the liquid jet recording device described here. Therefore, each of the head chip and the liquid jet head will hereinafter be described in parallel.

The liquid jet recording device described here is, for example, a printer for forming an image on a recording target medium. The types of the recording target medium are not particularly limited, but are, for example, paper, a film, a cloth, and a tile.

1-1. Overall Configuration

Firstly, an overall configuration of the liquid jet recording device will be described.

Figure 1:
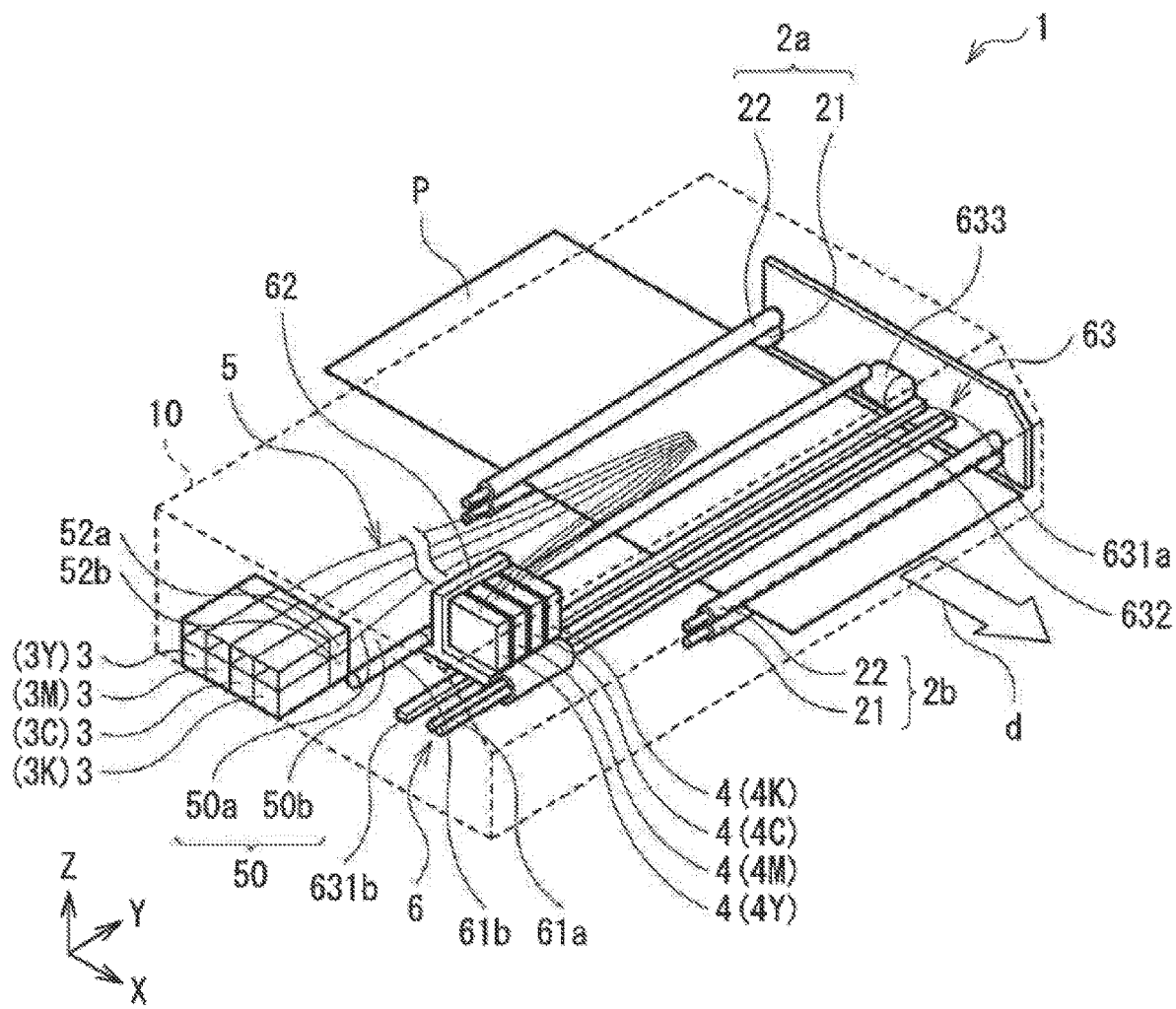
FIG. 1 is a schematic perspective view showing a schematic configuration example of a liquid jet recording device according to an embodiment of the present disclosure.

FIG. 1 shows a perspective configuration of a printer 1 as a specific example of the liquid jet recording device (an inkjet printer). In FIG. 1, outer edges (contours) of a housing 10 are represented by the dotted lines.

The printer 1 is, for example, an inkjet printer using a liquid (ink 9) for recording. Specifically, as shown in, for example, FIG. 1, the printer 1 is provided with a pair of carrying mechanisms 2a, 2b, ink tanks 3, inkjet heads 4, supply tubes 50, and a scanning mechanism 6 all disposed inside the housing 10.

[Carrying Mechanisms and Ink Tanks]

The pair of carrying mechanisms 2a, 2b are each a mechanism for carrying the recording paper P loaded into the printer 1 in a carrying direction D (an X-axis direction), and each include, for example, a grit roller 21 and a pinch roller 22. The ink tanks 3 are each a container for storing the ink 9. Here, the printer 1 is provided with the four ink tanks 3 (3Y, 3M, 3C, and 3K) for containing the ink 9 of, for example, respective colors different from each other, and the ink tanks 3Y, 3M, 3C, and 3K respectively contain, for example, the ink 9 of the yellow (Y) color, the ink 9 of the magenta (M) color, the ink 9 of the cyan (C) color, and the ink 9 of the black (K) color.

[Inkjet Heads and Supply Tubes]

The inkjet head 4 is a liquid jet head for jetting the ink 9 having a droplet shape supplied from the supply tube 50 to the recording paper P, and is, for example, an edge-shoot type inkjet head. In the edge-shoot type inkjet head 4, for example, as described later, each of channels C1 is disposed so as to extend in a predetermined direction (e.g., a Z-axis direction), and the ink 9 is jetted from each of nozzle holes H2 in substantially the same direction as the extending direction of each the channels C1 (see FIG. 3). In other words, the extending direction of each of the channels C1 and the direction in which the ink 9 is jetted from each of the nozzle holes H2 coincide with each other.

Here, the printer 1 is provided with, for example, the four inkjet heads 4 (4Y, 4M, 4C and 4K) for jetting the ink 9 different in color from each other as shown in FIG. 1. It should be noted that the detailed configuration of the inkjet heads 4 will be described later (see FIG. 2).

[Scanning Mechanism]

The scanning mechanism 6 is a mechanism for making the inkjet heads 4 perform a scanning operation in a direction crossing the carrying direction D, and includes, for example, a pair of guide rails 61a, 61b, a carriage 62, and a drive mechanism 63. For example, the carriage 62 includes a base 62a and a wall section 62b, and is capable of moving along the guide rails 61a, 61b in a direction crossing the carrying direction D while supporting the inkjet heads 4. The drive mechanism 63 includes, for example, a pair of pulleys 631a, 631b, a belt 632 having an endless shape, and a drive motor 633, wherein the belt 632 is coupled to, for example, the carriage 62.

1-2. Configuration of Liquid Jet Head

Figure 2:
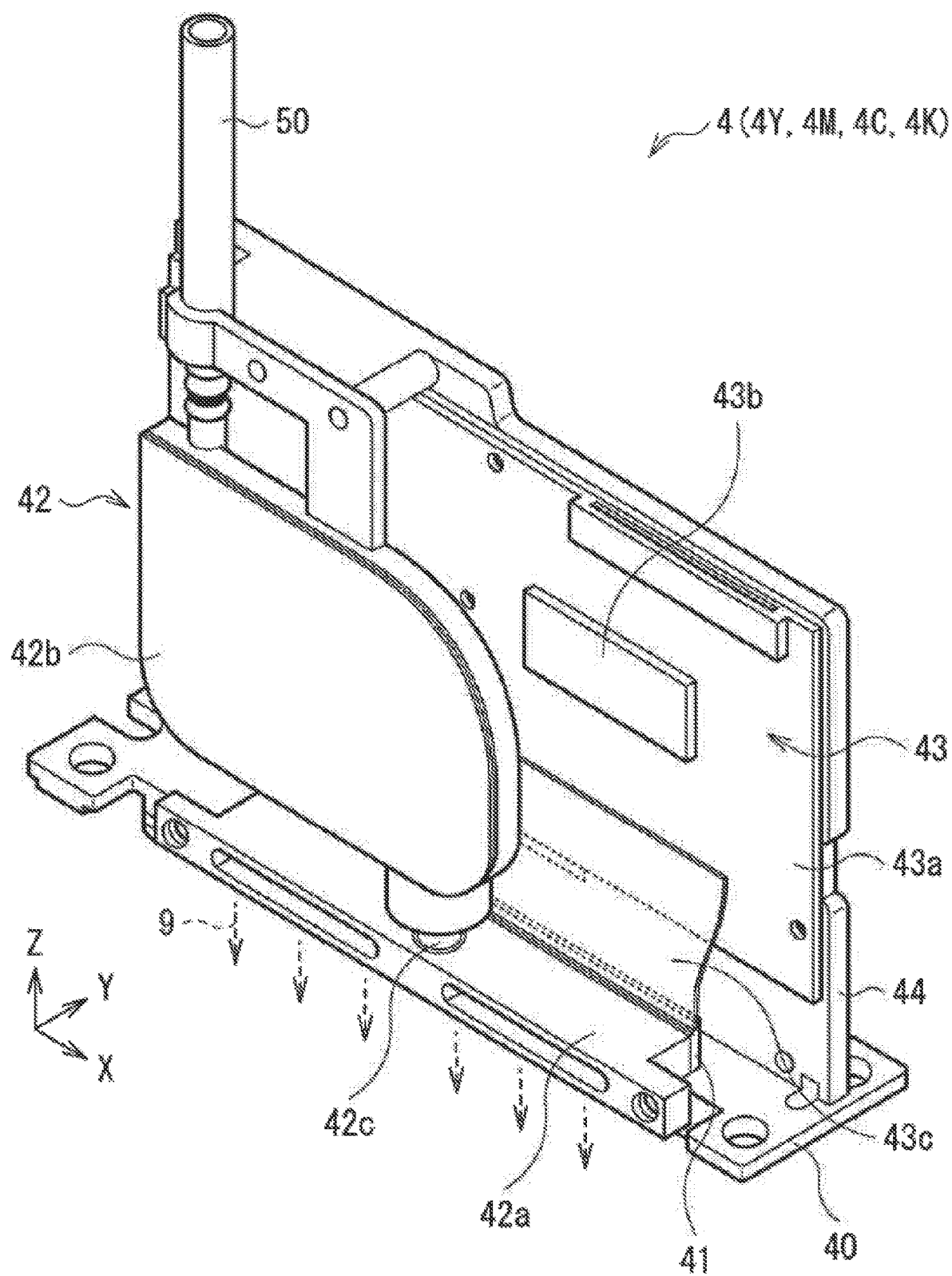
FIG. 2 is a perspective view showing a schematic configuration of the liquid jet head shown in FIG. 1.

FIG. 2 shows, in an enlarged manner, a perspective configuration of each of the inkjet heads 4 (4Y, 4M, 4C, and 4K) shown in FIG. 1.

As shown in FIG. 2, the inkjet heads 4 are each provided with a fixation plate 40, an inkjet head chip 41, a supply mechanism 42, a control mechanism 43, and a base plate 44. To one surface of the fixation plate 40, there are fixed the inkjet head chip 41, a supply mechanism 42 (a flow channel member 42a described later), and the base plate 44. Here, the inkjet head chip 41 is an embodiment of a "head chip" according to the present disclosure.

[Inkjet Head Chip]

The inkjet head chip 41 is a principal part of the inkjet head 4 for jetting the ink 9. It should be noted that the detailed configuration of the inkjet head chip 41 will be described later (see FIG. 3 through FIG. 5).

[Supply Mechanism]

The supply mechanism 42 supplies the inkjet head chip 41 (an ink introducing hole 410a described later; see FIG. 3 and FIG. 4) with the ink 9 having been supplied via the supply tube 50. The supply mechanism 42 includes, for example, the flow channel member 42a and a pressure buffer 42b coupled to each other via an ink coupling tube 42c. The flow channel member 42a is a flow channel through which the ink 9 flows, and to the pressure buffer 42b having a reservoir chamber of the ink 9, there is attached, for example, the supply tube 50.

[Control Mechanism]

The control mechanism 43 includes, for example, a circuit board 43a, a drive circuit 43b, and a flexible board 43c. The circuit board 43a includes, for example, the drive circuit 43b for driving the inkjet head chip 41, and the drive circuit 43b includes, for example, an integrated circuit (IC). The flexible board 43c electrically connects the drive circuit 43b and the inkjet head chip 41 (a drive electrodes Ed described later; see FIG. 5) to each other. Although not shown here, the flexible board 43c includes, for example, a plurality of terminals respectively coupled to the drive circuit 43*b* and the plurality of drive electrodes Ed.

1-3. Configuration of Head Chip

Figure 3:
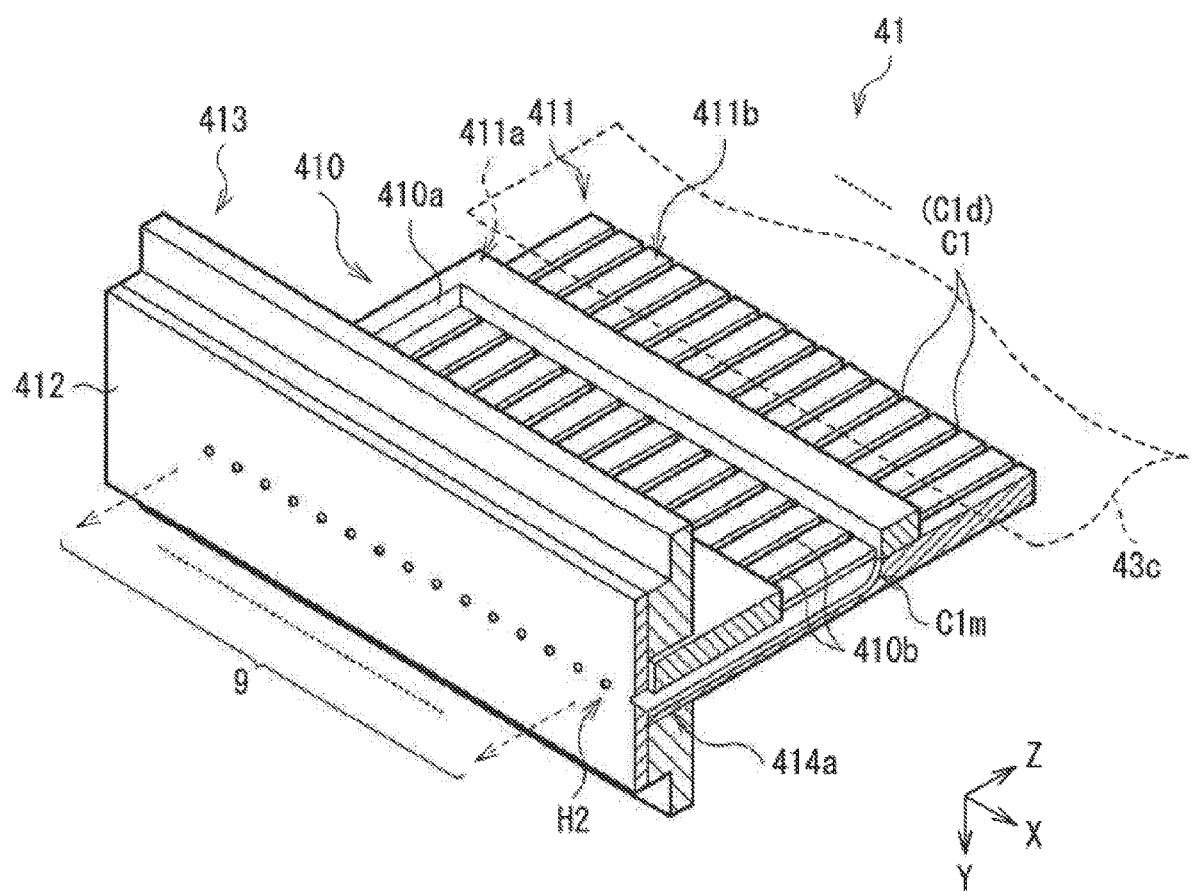
FIG. 3 is a perspective view showing a schematic configuration of the liquid jet head chip shown in FIG. 2.
Figure 4:
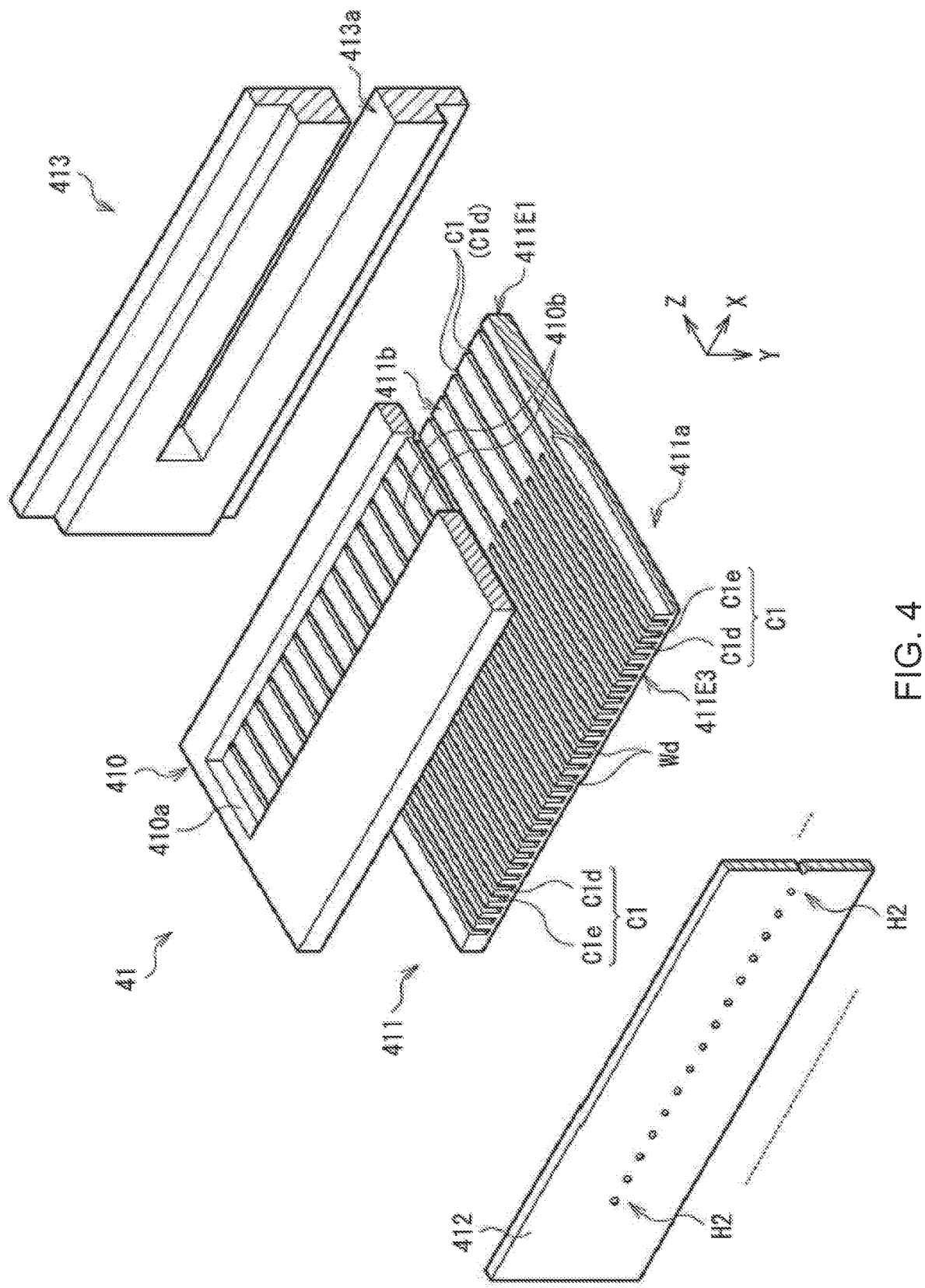
FIG. 4 is another perspective view showing a schematic configuration of the liquid jet head chip shown in FIG. 2.
Figure 5:
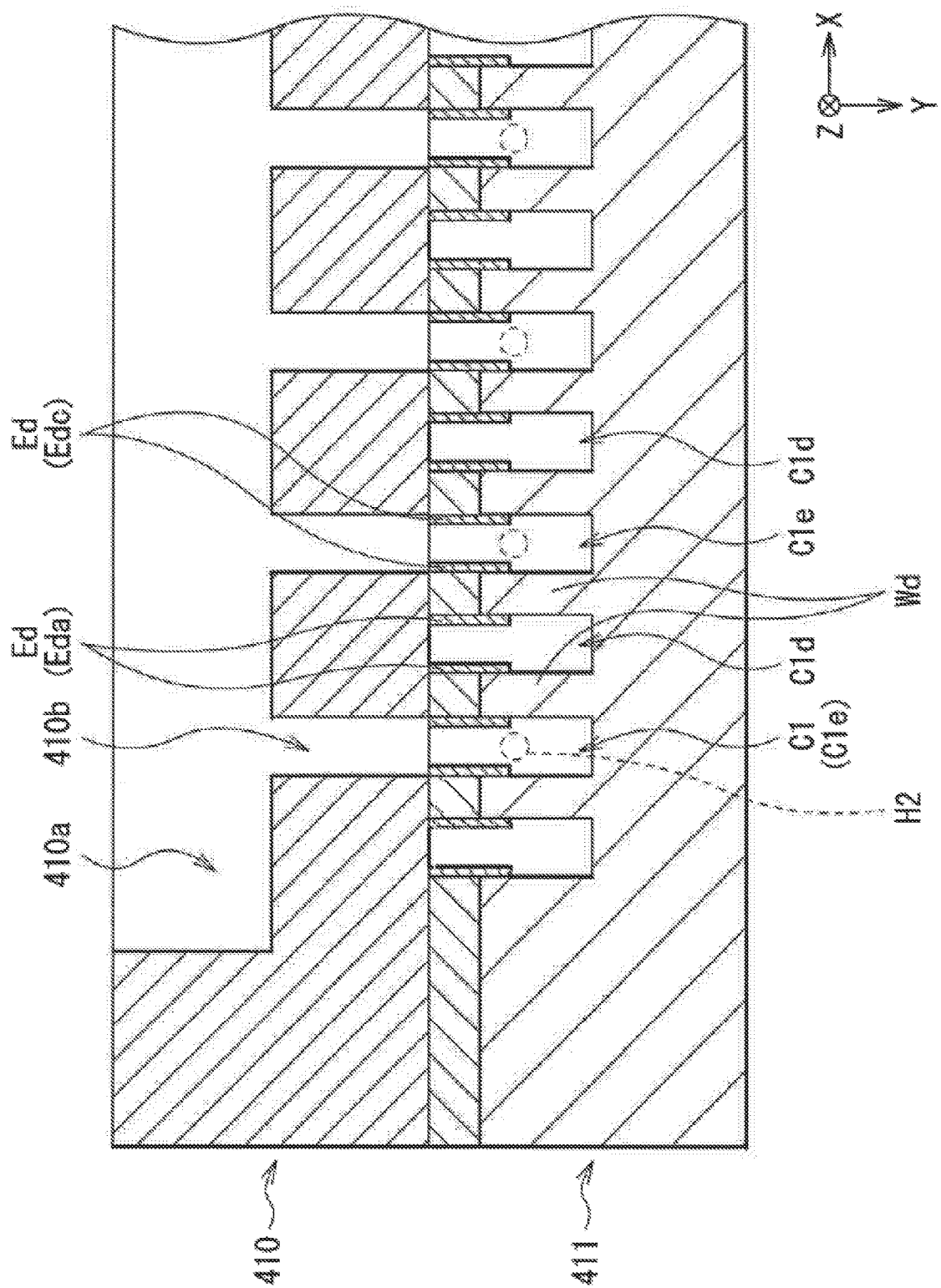
FIG. 5 is a schematic cross-sectional view showing a configuration of the cover plate and the actuator plate shown in FIG. 4.

FIG. 3 shows the state in which a series of constituents of the inkjet head chip 41 are combined with each other. In contrast, FIG. 4 shows the state in which the series of constituents are separated from each other in order to make the series of constituents of the inkjet head chip 41 eye-friendly. FIG. 5 shows a configuration in an X-Y cross-sectional surface of the inkjet head chip 41. In FIG. 5, the plurality of nozzle holes H2 is represented by the dotted lines. In FIG. 3, only the contour of a part of the flexible board 43*c* is represented by the dotted lines.

The inkjet head chip 41 includes, for example, a cover plate 410, an actuator plate 411, a nozzle plate (a jet hole plate) 412, and a support plate 413 as shown in FIG. 3 and FIG. 4. The cover plate 410 and the actuator plate 411 are stacked on one another. The nozzle plate 412 is made to have contact with the support plate 413 in the state in which, for example, the cover plate 410 and the actuator plate 411 are fitted into a fitting hole 413*a*.

The cover plate 410 is bonded to the actuator plate 411 via, for example, an adhesive. The nozzle plate 412 is attached to one end parts of the cover plate 410 and the actuator plate 411 in the Z-axis direction via an adhesive.

[Actuator Plate]

The actuator plate 411 is a member to be electrically driven for jetting the ink 9 from the plurality of nozzle holes H2.

The actuator plate 411 includes a plurality of drive walls Wd for defining the plurality of channels C1. Here, the "channels C1" each correspond to a specific example of a "groove" in the present disclosure.

The actuator plate 411 is a plate formed of a piezoelectric material such as lead zirconate titanate (PZT). The actuator plate 411 has, for example, a quadrangular planar shape. One side of the quadrangle is provided with an end part 411E1 of the actuator plate 411, and a side opposed to the side provided with the end part 411E1 is provided with an end part 411E3 (FIG. 4). For example, the flexible board 43*c* is coupled to the vicinity of the end part 411E1, and the end part 411E3 is bonded to the nozzle plate 412. Here, the end part 411E1 corresponds to a specific example of "one end" in the present disclosure, and the end part 411E3 corresponds to a specific example of "the other end" in the present disclosure.

As shown in FIG. 4, the actuator plate 411 is formed by stacking two piezoelectric substrates different in polarization direction from each other on one another along the thickness direction (the Z-axis direction) (a so-called chevron type). It should be noted that the configuration of the actuator plate 411 is not limited to the chevron type. Specifically, it is also possible to form the actuator plate 411 with, for example, a single (unique) piezoelectric substrate having the polarization direction set one direction along the thickness direction (the Z-axis direction) (a cantilever type or a monopole type as they are called). The channels C1 are each a non-penetrating groove, and a plurality of ejection channels (jet channels) C1*e* and a plurality of dummy channels (non-jet channels) C1*d* are arranged, for example, alternately in the X-axis direction. The ejection channels C1*e* are respectively communicated with the nozzle holes H2, and each function as a pressure chamber for applying pressure to the ink 9. In other words, it is arranged that the ejection channels C1*e* are filled with the ink 9 on the one hand, but the dummy channels C1*d* are not filled with the ink 9 on the other hand. Further, as shown in FIG. 5, each of the ejection channels C1*e* is communicated with the nozzle hole H2 in the nozzle plate 412 described later on the one hand, but each of the dummy channels C1*d* is not communicated with the nozzle hole H2, and is covered with the cover plate described later from above.

Each of the channels C1 extends in the Z-axis direction from the end part 411E3 of the actuator plate 411 toward the end part 411E1 thereof. It should be noted that each of the dummy channels C1*d* extends, for example, to the end 411E1 of the actuator plate 411, and terminates in the end part 411E1. In contrast, each of the ejection channels C1*e*, for example, does not extend to the end part 411E1 of the actuator plate 411, but terminates in the middle (at a position between the end part 411E3 and the end part 411E1). In other words, the length in the Z-axis of each of the ejection channels C1*e* is made shorter than the length in the Z-axis direction of each of the dummy channels C1*d*. Here, the dummy channel C1*d* corresponds to a specific example of a "first groove" in the present disclosure, and the ejection channel C1*e* corresponds to a specific example of a "second groove" in the present disclosure. Further, the dummy channel C1*d* and the ejection channel C1*e* each correspond to a specific example of a "groove" in the present disclosure.

It should be noted that as shown in, for example, FIG. 3 and FIG. 4, the inner wall surface C1*m* which defines each of the ejection channels C1*e* rises up in the vicinity of the end part of each of the ejection channels C1*e* on the far side from the nozzle plate 412.

The actuator plate 411 includes, for example, a first channel formation part 411*a* which is located on the end part 411E3 side, and is provided with both of the plurality of ejection channels C1*e* and the plurality of dummy channels C1*d*, and a second channel formation part 411*b* which is located on the end part 411E1 side, and is not provided with the plurality of ejection channels C1*e*, but is only provided with the plurality of dummy channels C1*d*. The plurality of drive walls Wd described above defines the plurality of channels C1 (the plurality of ejection channels C1*e* and the plurality of dummy channels C1*d*), and is therefore provided to the first channel formation part 411*a*.

The side surface of each of the drive walls Wd is provided with the drive electrode Ed extending in the Z-axis direction. The drive electrode Ed is an electrode for electrically driving (deforming) the drive wall Wd in order to make the plurality of ejection channels C1*e* function as the pressure chambers.

The drive electrodes Ed include pairs of common electrodes Edc disposed on the side surfaces of the drive walls Wd for defining the ejection channels C1*e*, and pairs of active electrodes Eda disposed on the side surfaces of the drive walls Wd for defining the dummy channels C1*d*. The active electrodes Eda and the common electrodes Edc each extend, for example, from an interface between the cover plate 410 and the actuator plate 411 to the middle of each of the inner wall surface (FIG. 5). The active electrode Eda and the common electrode Edc each extend to, for example, a deeper position (e.g., a position in the plus Y direction in FIG. 5) than a boundary (a bonding surface) between two piezoelectric substrates different in polarization direction from each other. In each of FIG. 3 and FIG. 4, illustration of the plurality of drive electrodes Ed is omitted.

Figure 9:
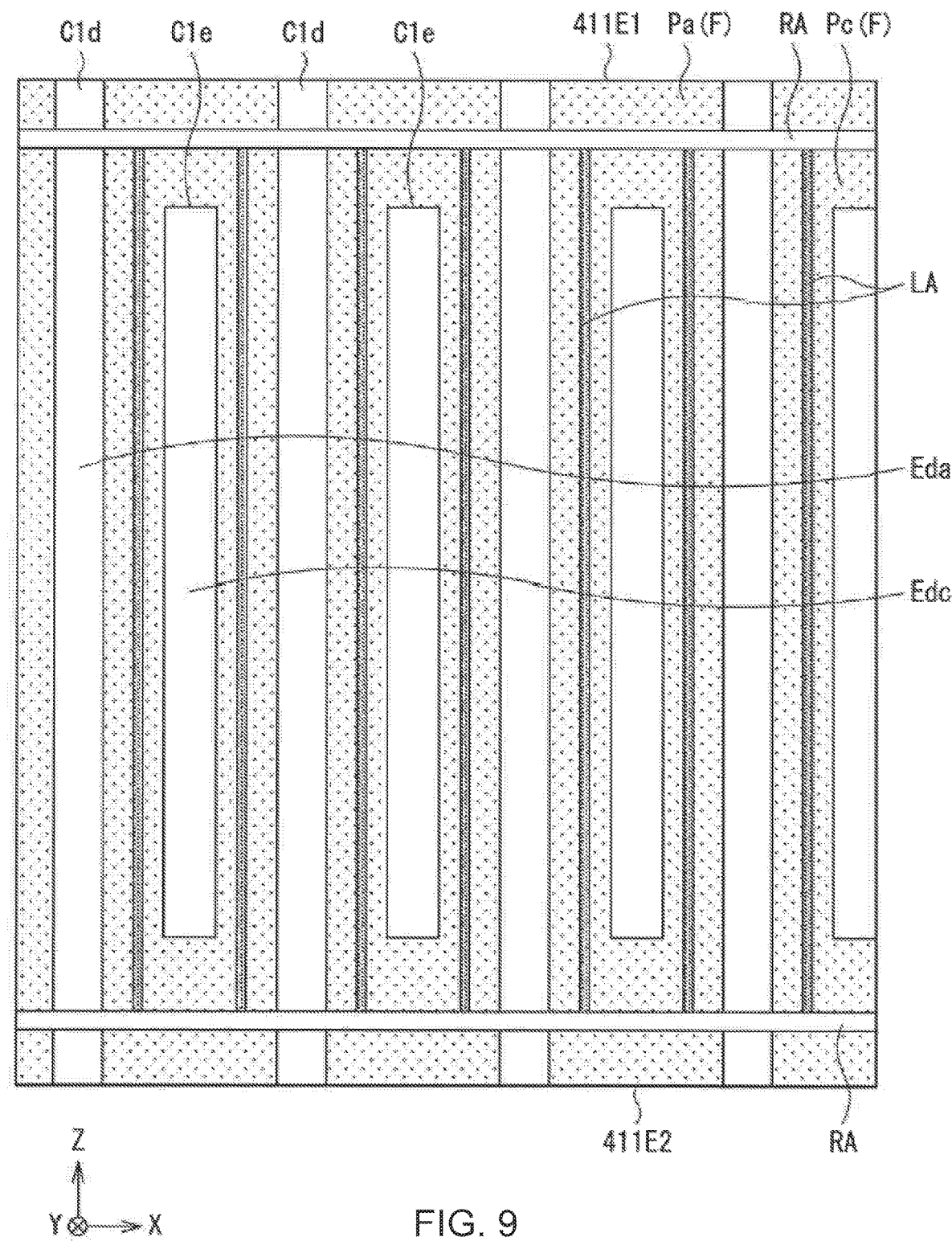
FIG. 9 is a schematic plan view for explaining an example of a process of the step S4 shown in FIG. 6.

On the opposite surface (hereinafter referred to as a surface of the actuator plate 411) of the actuator plate 411 to the cover plate 410, there are disposed a plurality of common electrode pads Pc electrically coupled to the common electrodes Edc, respectively, and a plurality of active electrode pads Pa electrically coupled to the active electrodes Eda, respectively. It should be noted that the plurality of common electrode pads Pc and the plurality of active electrode pads Pa are illustrated in FIG. 9 described later. In each of FIG. 3 and FIG. 4, illustration of the plurality of common electrode pads Pc and the plurality of active electrode pads Pa is omitted.

The common electrode pads Pc are each for electrically coupling the pair of common electrodes Edc opposed to each other in the same ejection channel C1e to each other, and are each disposed on the periphery of the ejection channel C1e.

The pair of active electrodes Eda opposed to each other in the same dummy channel C1d are electrically separated from each other. The active electrode pads Pa each electrically couple the pair of active electrodes Eda opposed to each other via the ejection channel C1e to each other. The active electrode pads Pa are each disposed between the dummy channel C1d adjacent to each other across the ejection channel C1e. The active electrode pads Pa are disposed so as to electrically be separated from the common electrode pads Pc, and are disposed at, for example, positions closer to the end part 411E1 than the common electrode pads Pc.

The common electrode pads Pc and the active electrode pads Pa are exposed from the cover plate 410. On the common electrode pads Pc and the active electrode pads Pa, there is mounted the flexible board 43c. Interconnection patterns (not shown) provided to the flexible board 43c are electrically coupled respectively to the common electrode pads Pc and the active electrode pads Pa described above. Thus, it is arranged that the drive voltages are respectively applied to the drive electrodes Ed from the drive circuit 43b via the flexible board 43c.

For example, the drive voltages different in polarity from each other are respectively applied to the common electrode Edc and the active electrode Eda. The common electrode Edc is connected to, for example, a ground potential (GND potential), and the active electrode Eda is connected to a predetermined potential. It is also possible for the common electrode Edc to be connected to, for example, a negative potential.

[Cover Plate]

The cover plate 410 is a member for covering the actuator plate 411. The cover plate 410 is disposed so as to be opposed to the actuator plate 411.

Specifically, as shown in, for example, FIG. 3 through FIG. 5, the cover plate 410 has an ink introduction hole 410a having a recessed shape and provided with a plurality of slits 410b. Each of the slits 410b is a penetrating groove extending in, for example, substantially the same direction as the extending direction (the Z-axis) of the each of the channels C1.

Since the positions of the slits 410b respectively correspond to the positions of the ejection channels C1e, the ink introduction hole 410a is communicated with the ejection channels C1e via the respective slits 410b. Thus, since the ink 9 is supplied to the ejection channels C1e via the respective slits 410b, the plurality of ejection channels C1e is filled with the ink 9.

[Nozzle Plate]

The nozzle plate 412 has the plurality of nozzle holes H2 as penetrating openings, and is opposed to the actuator plate 411. The plurality of nozzle holes H2 is arranged, for example, at intervals in the X-axis direction, and the opening shape of each of the nozzle holes H2, namely the shape of each of the nozzle holes H2 viewed from the Z-axis direction is, for example, a circular shape. The inner diameter of the nozzle hole H2 gradually decreases in, for example, a direction in which the ink 9 is jetted. This is because, due to this configuration, the ink 9 is improved in jet speed and ejection straightness. The nozzle plate 412 includes any one species or two or more species of insulating materials such as polyimide. It is also possible for the nozzle plate 412 to include any one species or two or more species of electrically conductive materials such as stainless steel (SUS).

[Support Plate]

As shown in, for example, FIG. 4, the support plate 413 has the fitting hole 413a extending in the X-axis direction, and the cover plate 410 and the actuator plate 411, for example, are fitted into the fitting hole 413a in a state of being stacked on one another.

1-4. Method of Manufacturing Inkjet Head 4 (Inkjet Head Chip 41)

Figure 6:
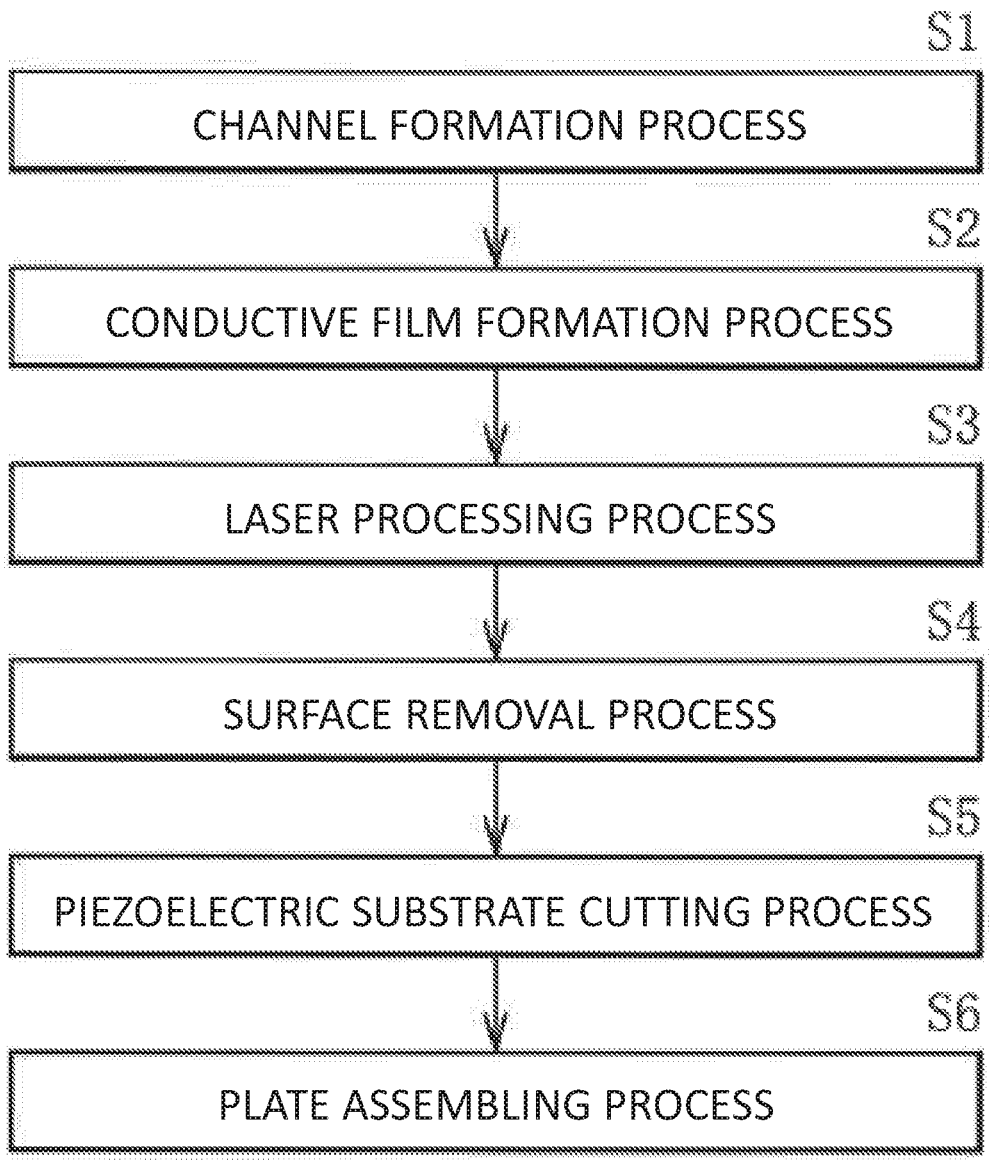

Then, a method of manufacturing the inkjet head 4 will be described using FIG. 6 through FIG. 10. FIG. 6 is a diagram showing an example of the method of manufacturing the inkjet head 4 in the order of the processes. FIG. 7, FIG. 8, FIG. 9, and FIG. 10 are schematic plane views for explaining the steps S2, S3, S4, and S5 shown in FIG. 6, respectively. Here, a process of manufacturing the actuator plate 411 will mainly be described.

Firstly, a piezoelectric substrate (a piezoelectric substrate 411Z shown in FIG. 6 through FIG. 8 described later) made of a piezoelectric material such as PZT is prepared. The piezoelectric substrate 411Z is formed of, for example, a stacked body of two piezoelectric substrates different in polarization direction from each other, and has a quadrangular planar shape. One side of the piezoelectric substrate 4112 constitutes the end part 411E1 of the actuator plate 411. A side opposed to the side provided with the end part 411E1 is provided with an end part 411E2. As described later, the end part 411E3 (see FIG. 4) of the actuator plate 411 is formed between the end part 411E1 and the end part 411E2.

Then, the channels C1 (the ejection channels C1e and the dummy channels C1d) are provided (step S1) to the surface of the piezoelectric substrate 411Z. The channels C1 are formed by performing groove processing on the piezoelectric substrate 411Z using, for example, a dicer. The plurality of grooves (the channels C1) is formed so as to extend from the end part 411E1 side toward the end part 411E2 side. Each of the channels C1 is formed so as to open on the surface of the piezoelectric substrate 411Z.

Figure 7:
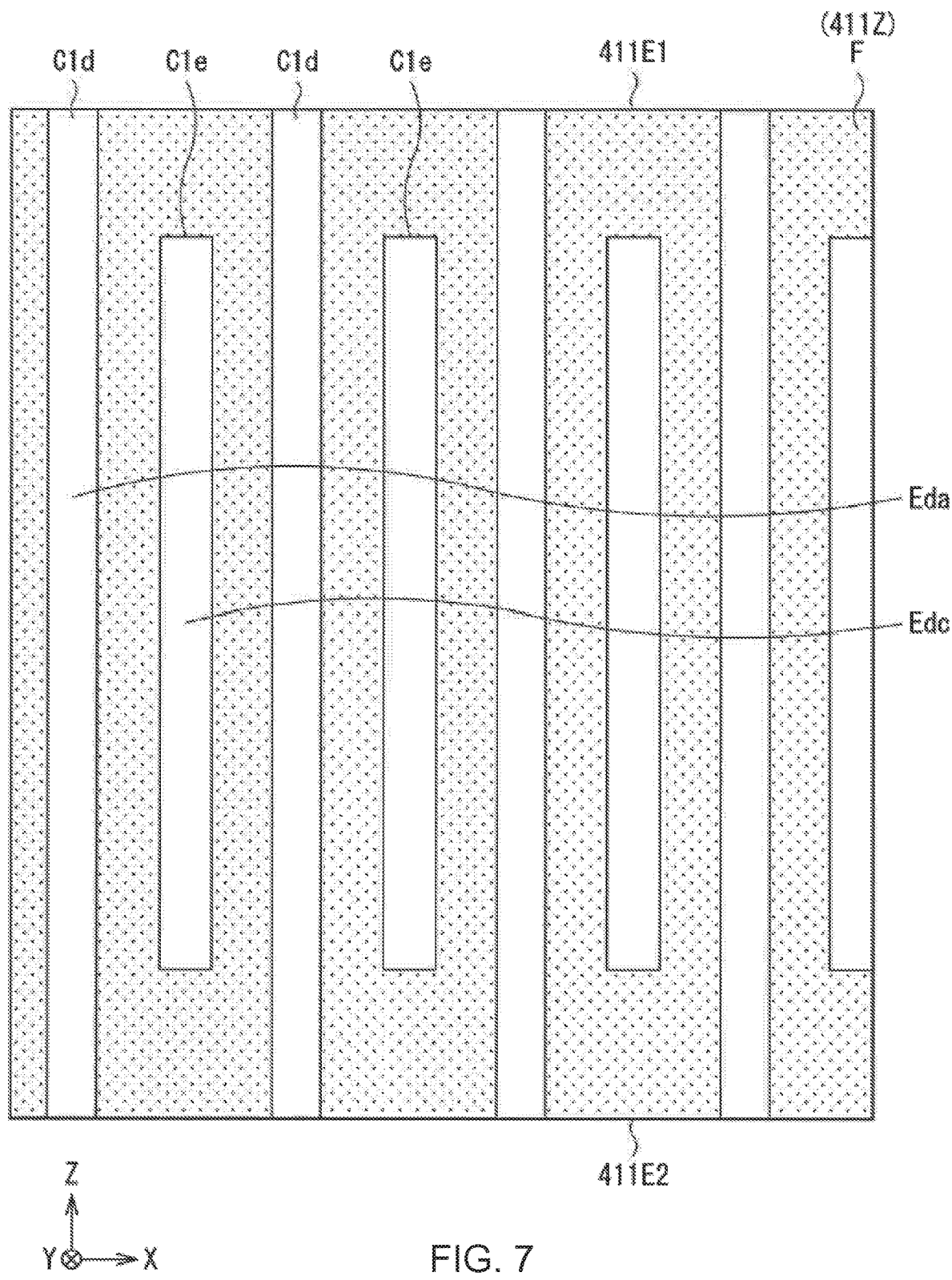
FIG. 7 is a schematic plan view for explaining an example of a process of the step S2 shown in FIG. 6.

After providing the channels C1 to the piezoelectric substrate 411Z, the electrically conductive material such as gold (Au) is deposited on the surface of the piezoelectric substrate 411Z and the side surfaces of each of the channels C1 using, for example, an oblique vapor deposition method. Thus, the drive electrodes Ed on the side surfaces in each of the channels C1, and a conductive film F on the surface of the piezoelectric substrate 411Z are formed (step S2). The conductive film F is for forming the common electrode pads Pc and the active electrode pads Pa. As shown in FIG. 7, the conductive film F is formed throughout the entire surface of the piezoelectric substrate 411Z including areas between the ejection channels C1e and the dummy channels C1d adjacent to each other. The conductive film F and the drive electrodes Ed inside the channels C1 are formed continuously.

Figure 8:
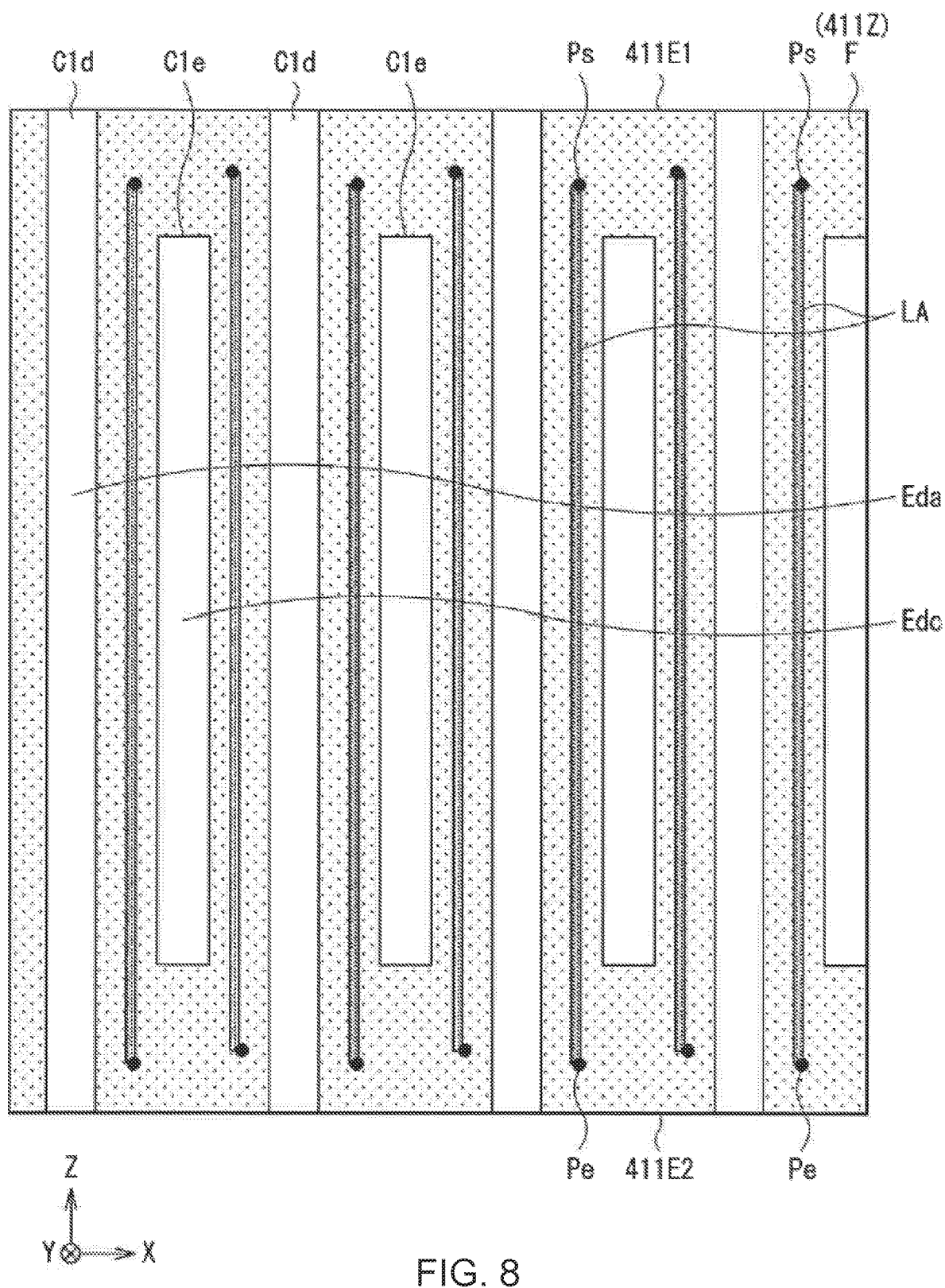
FIG. 8 is a schematic plan view for explaining an example of a process of the step S3 shown in FIG. 6.

Subsequently, laser processing is performed on the surface of the piezoelectric substrate 411Z on which the conductive film F has been formed. As shown in FIG. 8, due to the laser processing, laser processing areas LA are formed in the conductive film F in the areas between the ejection channels C1e and the dummy channels C1d adjacent to each other. The laser processing is performed on the areas between all of the ejection channels C1e and the dummy channels C1d. For example, the area from a start point Ps on the end part 411E1 to an end point Pe set in the middle of the path toward the end part 411E2 is linearly irradiated with the laser. In other words, in the conductive film F, there is formed the plurality of laser processing areas LA each having a linear shape roughly parallel to the extending direction (the Z-axis direction) of the channels C1. In the areas (the laser processing areas LA) irradiated with the laser, the conductive film F is removed. The length (the size in the Z-axis direction) of the laser processing area LA is made longer than the length of the ejection channel C1e. For example, the start point Ps is set to a position on the end part 411E1 side of one end of the ejection channel C1e in the Z-axis direction, and the end point Pe is set to a position on the end part 411E2 side of the other end of the ejection channel C1e in the Z-axis direction.

In the laser processing process, it is preferable to perform the irradiation with ultraviolet light. For example, the conductive film F is irradiated with the ultraviolet light with the wavelength of 266 nm. By using the ultraviolet light, since gold (Au) constituting the conductive film F is more easily evaporated compared to the case of using the light (e.g., the light with the wavelength of 532 nm) longer in wavelength, it is possible to reduce the height of the debris deposited due to the laser irradiation. If the height of the debris is large, a gap occurs when bonding the actuator plate 411 and the cover plate 410 with each other, and there is a possibility that the leakage of the ink 9 occurs. Due to the leakage of the ink 9, the yield ratio drops. By using the ultraviolet light in the laser processing process, it is possible to reduce the height of the debris to prevent such leakage of the ink 9 from occurring. Therefore, it becomes possible to increase the yield ratio.

After forming the plurality of laser processing areas LA in the conductive film F, surface removal processing is performed (step S4) is performed on the surface of the piezoelectric substrate 411Z. As shown in FIG. 9, according to the above process, surface removal areas RA are formed on the surface of the piezoelectric substrate 411Z. In the surface removal processing, for example, the surface of the piezoelectric substrate 411Z is ground in a direction crossing the laser processing areas LA using a dicer. Specifically, there are formed the surface removal area RA which includes the plurality of start points Ps of the laser processing, and extends in the arrangement direction (the X-axis direction) of the channels C1, and the surface removal area RA which includes the plurality of end points Pe of the laser processing, and extends in the arrangement direction of the channels C1. In the areas (the surface removal areas RA) on which the surface removal processing has been performed, the conductive film F is removed. The surface removal processing can also be polishing or milling of the surface of the piezoelectric substrate 411Z besides the grinding of the surface of the piezoelectric substrate 411Z using the dicer described above.

In the present embodiment, since the surface removal areas RA are formed at least in the parts respectively including the plurality of start points Ps and the plurality of end points Pe out of the surface of the piezoelectric substrate 411Z in such a manner, the surface of the piezoelectric substrate 411Z in the vicinity of the start points Ps and the end points Pe is removed. The debris is apt to be deposited at the start points Ps and the end points Pe of the laser processing compared to other laser processing areas LA. As described above, due to the deposition of the debris, there is a possibility that the leakage of the ink 9 occurs. Further, a shape such as a curved shape different from other laser processing areas LA is apt to appear at the start points Ps and the end points Pc of the laser processing. By forming the surface removal areas RA so as to respectively include the plurality of start points Ps and the plurality of end points Pe of the laser processing, such start points Ps and end points Pe of the laser processing are removed, and therefore, it becomes possible to increase the yield ratio.

By forming the laser processing areas LA and the surface removal areas RA on the surface of the piezoelectric substrate 411Z in such a manner, the conductive film F in the area surrounded by the laser processing areas LA adjacent to each other across the ejection channel C1e and the two surface removal areas RA, and the conductive film F outside this area are electrically separated from each other. In other words, the conductive film F inside the area surrounded by the laser processing areas LA and the surface removal areas RA and the conductive film F between the surface removal area RA and the end part 411E1 are electrically separated from each other. The conductive film F inside the area surrounded by the laser processing areas LA and the surface removal areas RA is electrically coupled to the common electrode Edc, and the conductive film between the surface removal area RA and the end part 411E1 is electrically coupled to the active electrode Eda. In other words, the common electrode pad Pc is formed by the conductive film F inside the area surrounded by the laser processing areas LA and the surface removal areas RA, namely the conductive film F on the periphery of the ejection channel C1e, and the active electrode pad Pa is formed by the conductive film F between the surface removal area RA and the end part 411E1.

Although the details will be described later, by forming the common electrode pads Pc and the active electrode pads Pa using the laser processing and the surface removal processing in such a manner, the photolithography method becomes unnecessary when forming the common electrode pads Pc and the active electrode pads Pa. Therefore, it becomes possible to solve a problem due to the use of the photolithography method. The problem due to the use of the photolithography method will be described later.

Figure 11A:
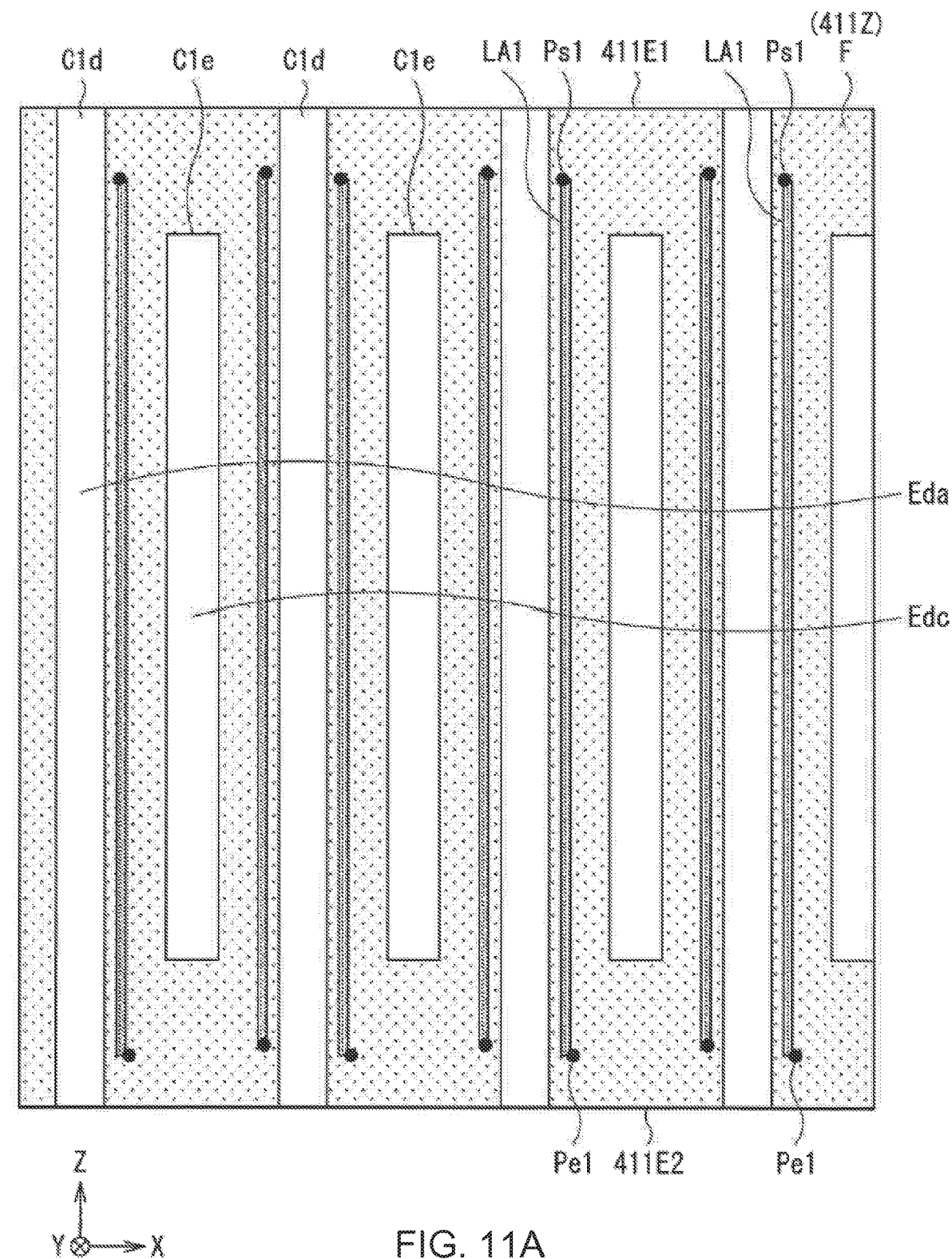
FIG. 11A is a schematic plan view for explaining another example of a process of the step S3 shown in FIG. 6.
Figure 11B:
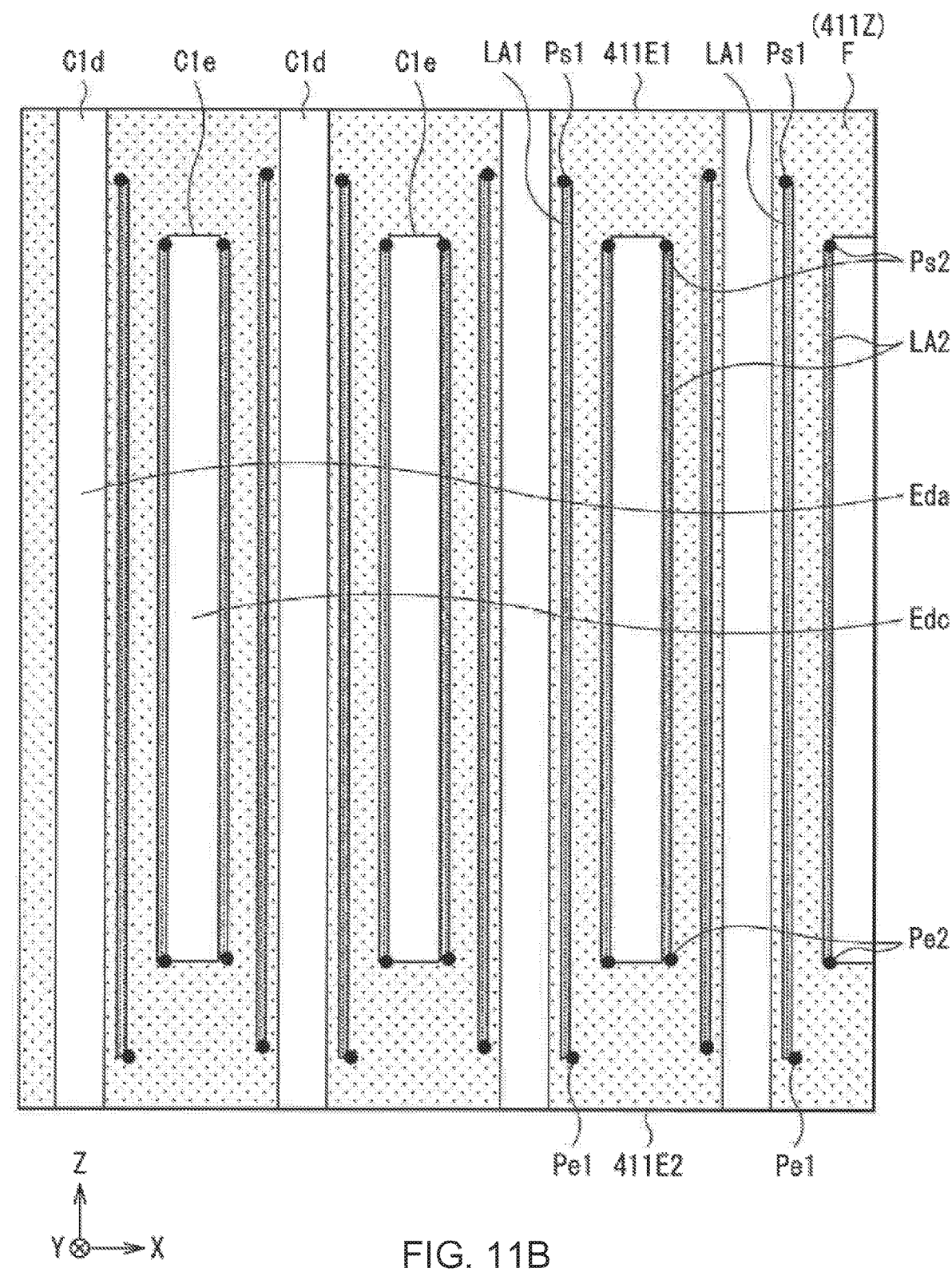
FIG. 11B is a schematic plan view showing a process following the process shown in FIG. 11A.
Figure 11C:
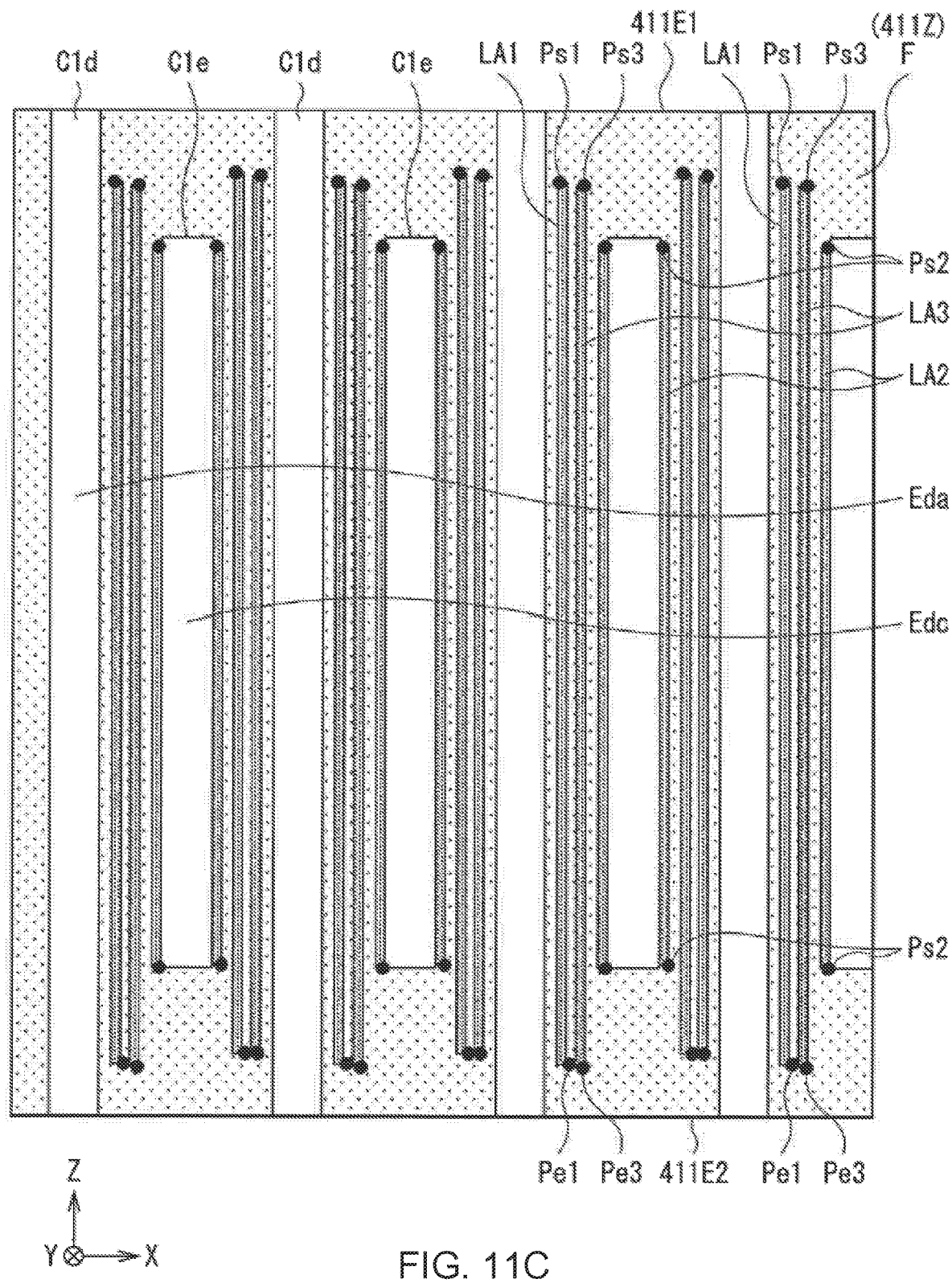
FIG. 11C is a schematic plan view showing a process following the process shown in FIG. 11B.

FIG. 11A through FIG. 11C show another example of the laser processing process in the step S3. It is also possible to arrange that the plurality of laser processing areas (the laser processing areas LA1, LA2, LA3) are formed between the ejection channel C1e and the dummy channel C1d adjacent to each other as shown in FIG. 11A through FIG. 11C. Thus, unnecessary conductive film F between the ejection channel C1e and the dummy channel C1d adjacent to each other is more effectively removed. Therefore, it is possible to suppress the increase in current amount due to the unnecessary conductive film F to reduce the power consumption. Further, it is possible to ensure the necessary current amount for driving to perform the stable ejection.

Firstly, as shown in FIG. 11A, the laser processing is performed on the surface of the piezoelectric substrate 411Z between the ejection channel Cle and the dummy channel C1d adjacent to each other along the extending direction (the Z-axis direction) of the channels C1 from the start point Ps1 on the end part 411E1 side to the end point Pe1 set in the middle of the way toward the end part 411E2. Thus, the laser processing area LA1 having a linear shape is formed in the conductive film F between the ejection channel C1e and the dummy channel C1d adjacent to each other. The laser processing area LA1 is formed to have the length longer than the length in the Z-axis direction of the ejection channel C1e similarly to the laser processing area LA (FIG. 8). The laser processing area LA1 is formed, for example, close to the dummy channel C1d in the X-axis direction between the ejection channel C1e and the dummy channel C1d.

Then, as shown in FIG. 11B, the laser processing is performed on the surface of the piezoelectric substrate 411Z between the laser processing area LA1 and the ejection channel C1e along the extending direction (the Z-axis direction) of the channels C1 from the start point Ps2 on the end part 411E1 side to the end point Pe2 set in the middle of the way toward the end part 411E2. Thus, the laser processing area LA2 having a linear shape is formed in the conductive film F between the laser processing area LA1 and the ejection channel C1e. The length of the laser processing area LA2 can also be made shorter than the length in the Z-axis direction of the ejection channel C1e. By making the length of the laser processing area LA2 shorter than the length in the Z-axis direction of the ejection channel C1e, the area of the common electrode pad Pc increases compared to the case (FIG. 12 described later) of forming the laser processing area LA2 roughly the same level in length as the laser processing area LA1 Therefore, it becomes easy to reliably couple the common electrode pad Pc and the flexible board 43c to each other.

Figure 12:
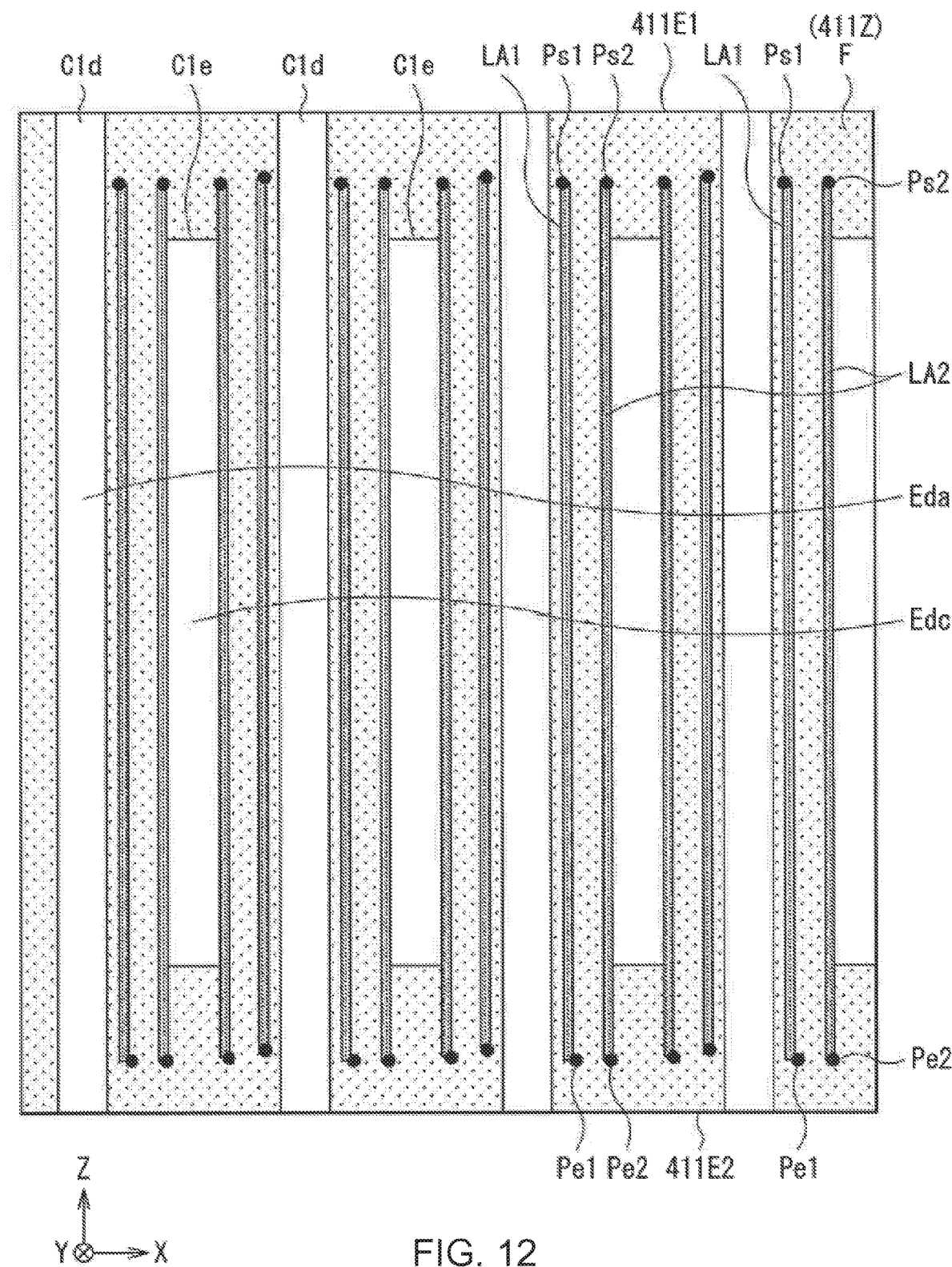
FIG. 12 is a schematic plan view showing another example of the process following the process shown in FIG. 11A.

As shown in FIG. 12, the length of the laser processing area LA2 can also be made longer than the length in the Z-axis direction of the ejection channel C1e, For example, it is also possible to make the length of the laser processing area LA2 roughly the same in level as the length of the laser processing area LA1. Thus, the surface of the piezoelectric substrate 411Z including the vicinity of the start points Ps2 and the vicinity of the end points Pe2 of the laser processing area LA2 is removed in the subsequent surface removal process (step S4), and therefore, the deposition of the debris can effectively be prevented.

Subsequently, as shown in FIG. 11C, the laser processing is performed on the surface of the piezoelectric substrate 411Z between the laser processing area. LA1 and the laser processing area LA2 along the extending direction (the Z-axis direction) of the channels C1 from the start point Ps3 on the end part 411E1 side to the end point Pe3 set in the middle of the way toward the end part 411E2. Thus, the laser processing area LA3 having a linear shape is formed in the conductive film F between the laser processing area LA1 and the laser processing area LA2. The laser processing area LA3 is formed to have the length longer than the length in the Z-axis direction of the ejection channel Cle similarly to the laser processing area LA (FIG. 8).

It is desirable to form the laser processing area LA3 between the laser processing area LA1 and the laser processing area LA2 after forming the laser processing area LA1 and the laser processing area LA2 as described above. Thus, it becomes easy to remove the debris on the periphery of each of the laser processing area LA1 and the laser processing area LA2. Therefore, it becomes difficult for the debris occurring on the periphery of the laser processing area LA1 and the debris occurring on the periphery of the laser processing area LA2 to be coupled to each other, and it is possible to prevent the short circuit via the debris from occurring.

After forming the laser processing area LA3, for example, the surface removal processing is performed (step S4) on the surface of the piezoelectric substrate 411Z so as to include the start points Ps1, Ps3 and the end points Pe1, Pe3 of the laser processing areas LA1, LA3. It is also possible to perform the surface removal processing on the surface of the piezoelectric substrate 411Z so as to include the start points Ps1, Ps2, and Ps3 and the end points Pe1, Pe2, and Pe3 of the laser processing areas LA1, LA2, and LA3 (see FIG. 12).

Figure 10:
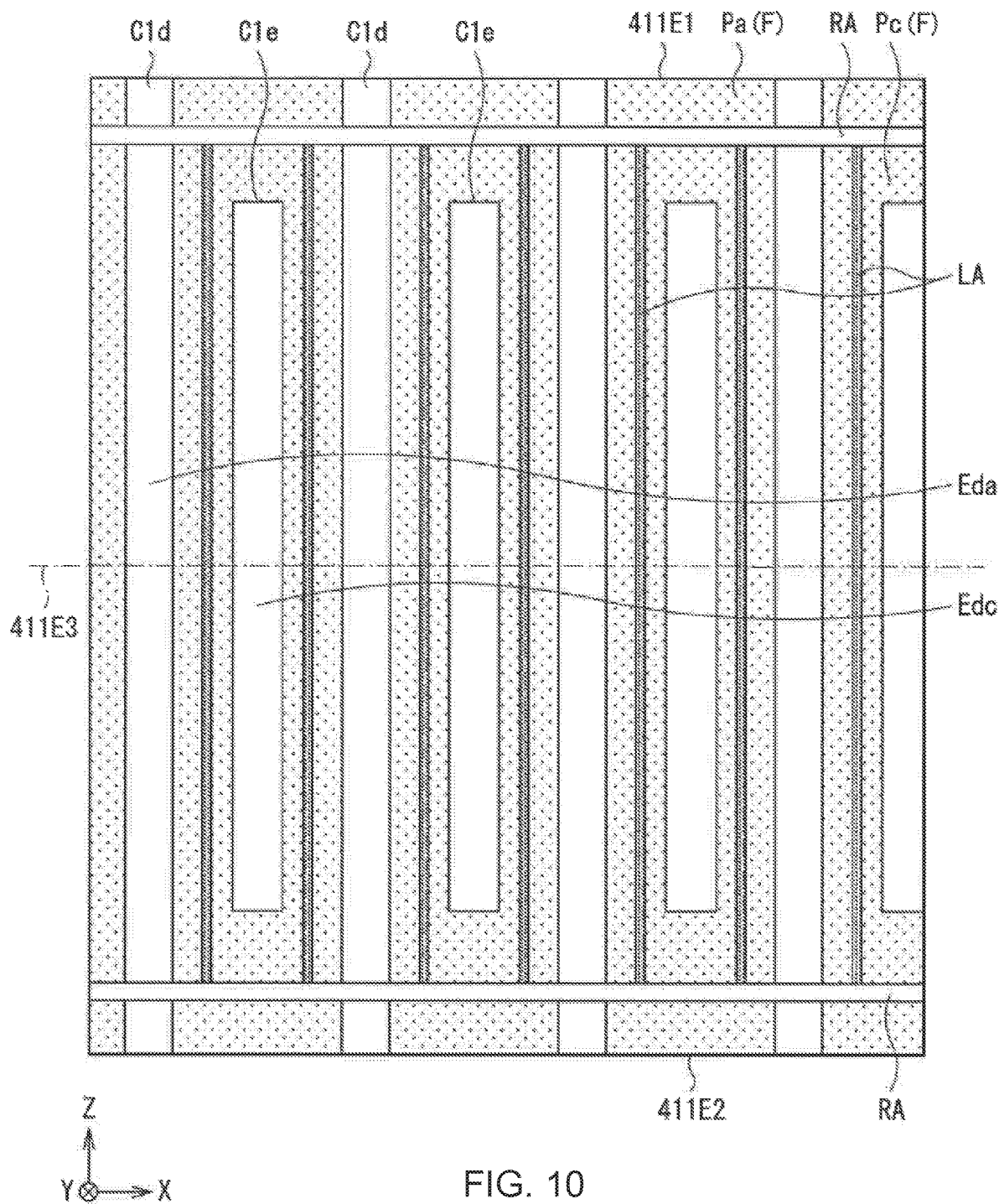
FIG. 10 is a schematic plan view for explaining an example of a process of the step S5 shown in FIG. 6.

After forming the common electrode pads Pc and the active electrode pads Pa in such a manner, the piezoelectric substrate 411Z is cut (step S5) between the end part 411E1 and the end part 411E2. As shown in FIG. 10, the cutting line forms the end part 411E3, and for example, the two actuator plates 411 are formed. After completing the actuator plate 411, assembling of the actuator plate 411 and other plates (e.g., the cover plate 410 and the nozzle plate 412) is performed (step S6). Thus, the inkjet head 4 (the inkjet head chip 41) shown in FIG. 2 through FIG. 5 and so on is completed.

1-5. Operations

[Operations of Printer]

In the printer 1, the ink 9 is jetted to the recording paper P while the recording paper P is carried in the carrying direction D, and the inkjet head 4 reciprocates in the direction crossing the carrying direction D. Thus, images are recorded on the recording paper P.

[Operations of Inkjet Heads]

In each of the inkjet heads 4, the ink 9 is jetted to the recording paper P using a shear mode in, for example, the following procedure.

In the inkjet head 4, when the drive circuit 43b applies the drive voltages to the actuator plate 411 (the plurality of active electrodes Eda), the drive circuit 43b applies a corresponding voltage to the nozzle plate 412. In this case, each of the drive walls Wd makes a flexural deformation in the Y-axis direction using the piezoelectric thickness shear effect. Thus, the capacity of each of the ejection channels C1e increases, and therefore, the ink 9 is induced into the ejection channel C1e. Subsequently, when the drive voltage is set to zero (0 V), and at the same time, the corresponding voltage is also set to zero (0 V), each of the drive walls Wd deforms so as to be restored to the original state. Thus, the ink 9 having been induced into the ejection channel C1e is pressurized due to the decrease in capacity of the ejection channel C1e, and therefore, the ink 9 is jetted from the nozzle hole H2 to the recording paper P.

1-6. Functions and Advantages

Then, the functions and the advantages in the inkjet head chips 41, the inkjet heads 4, and the printer 1 according to the present embodiment will be described.

In the inkjet head 4 (the inkjet head chip 41) according to the present embodiment, since the common electrode pads Pc and the active electrode pads Pa are formed using the laser processing process (the step S3 in FIG. 6) and the surface removal process (the step S4 in FIG. 6) as described above, the photolithography method becomes unnecessary when forming the common electrode pads Pc and the active electrode pads Pa. Therefore, it becomes possible to solve the problem due to the use of the photolithography method.

Figure 13:
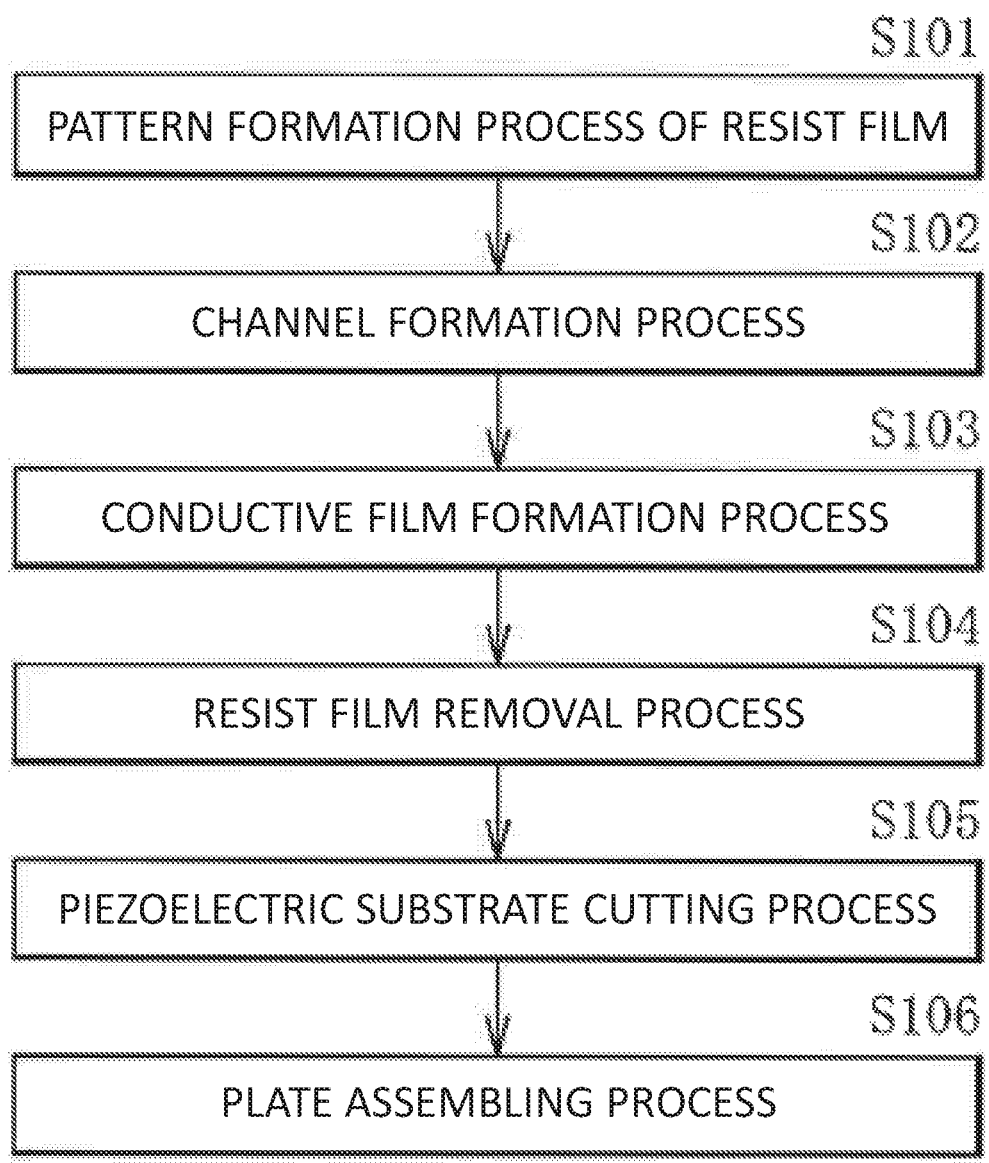
FIG. 13 is a flowchart showing an example of a method of manufacturing the liquid jet head in the case of using a photolithography method instead of the steps S3, S4 shown in FIG. 6.

FIG. 13 shows an example of a manufacturing process when forming the common electrode pads Pc and the active electrode pads Pa using the photolithography method. In this manufacturing process, firstly, a pattern of a resist film is formed (step S101) on the surface of the piezoelectric substrate 411Z. Then, the plurality of grooves (the channels C1) is provided (step S102) to the piezoelectric substrate 411Z on which the resist film has been formed. Subsequently, the conductive film F is formed (step S103) on the surface of the piezoelectric substrate 411Z and in the channels C1 using, for example, the oblique vapor deposition method. Subsequently, the resist film is removed (step S104). Thus, the conductive film F formed on the resist film is removed (the liftoff method). Due to the liftoff method, the common electrodes Edc and the common electrode pads Pc are electrically separated from the active electrodes Eda and the active electrode pads Pa. Subsequently, similarly to the description with reference to FIG. 6, cutting (step S105) of the piezoelectric substrate 411Z and assembling (step S106) of the plates are performed.

When forming the common electrode pads Pc and the active electrode pads Pa using the photolithography method in such a manner, the number of processes increases due to the pattern formation process (step S101) of the resist film and the removal process (step S104) of the resist film.

Further, in the process (step S104) for removing the resist film, burrs are apt to occur in the conductive film F. Due to the burrs, a gap occurs when bonding the actuator plate 411 and the cover plate 410 with each other, and there is a possibility that the leakage of the ink 9 occurs. There is a possibility that the yield ratio drops due to the failure when forming such an actuator plate 411.

Further, when the pattern of the resist film is made fine, since the adhesion between the resist film and the piezoelectric substrate 411Z decreases, it becomes difficult to form the common electrode pads Pc and the active electrode pads Pa corresponding to the fine drive electrodes Ed.

In contrast, since in the inkjet head chip 41 according to the present embodiment, patterning of the conductive film F is performed using the laser processing (step S3) and the surface removal processing (step S4), such a photolithography method as described above becomes unnecessary. Therefore, it becomes possible to form the common electrode pads Pc and the active electrode pads Pa with the smaller number of processes compared to the case of using the photolithography method. Further, it is possible to suppress the occurrence of the leakage of the ink 9 due to the burrs. Therefore, it becomes possible to suppress the occurrence of the failure when forming the actuator plate 411 to improve the yield ratio of the inkjet head chip 41, the inkjet head 4, and the printer 1 compared to the case of using the photolithography method.

Further, in the laser processing process, the size of the laser processing area LA is easily controlled by a laser output adjustment, an adjustment of the focal position, and so on. Therefore, it is possible to easily form the common electrode pads Pc and the active electrode pads Pa corresponding to the patterns of the fine drive electrodes Ed. In other words, by using the laser processing process, it is possible to easily adjust the pattern of the conductive film F compared to the case of using the photolithography method, and it becomes possible to increase the degree of design freedom of the inkjet head chip 41, the inkjet head 4, and the printer 1.

Further, here, since the surface removal processing is performed on the parts respectively including the start points Ps and the end points Pe of the laser processing out of the surface of the piezoelectric substrate 411Z, the surface of the piezoelectric substrate 411Z in the vicinity of the start points Ps and the end points Pe of the laser processing is removed. Therefore, the debris deposited at the start points Ps and the end points Pe of the laser processing is removed together with the surface of the piezoelectric substrate 411Z, and it is possible to prevent the leakage of the ink 9 due to the deposition of the debris from occurring. Further, it is possible to reduce the influence of the laser processing shape such as a curved shape which can occur at the start points Ps and the end points Pe of the laser processing. Therefore, the occurrence of the failure when forming the actuator plate 411 can more effectively be suppressed, and it becomes possible to improve the yield ratio of the inkjet head chip 41, the inkjet head 4, and the printer 1.

As described later, it is also possible to form the common electrode pads Pc and the active electrode pads Pa without using the surface removal process (step S4) (FIG. 14 described later), but by performing the surface removal process using, for example, a dicer or the like, it is possible to simply remove the conductive film F in broader area compared to the laser processing. It is possible to select the method of more simply forming the common electrode pads Pc and the active electrode pads Pa in accordance with the design of the inkjet head chip 41.

As described hereinabove, in the inkjet head chip 41, the inkjet head 4, and the printer 1 according to the present embodiment, since it is arranged that the common electrode pads Pc and the active electrode pads Pa are formed by using the laser processing and the surface removal processing, it becomes possible to suppress the occurrence of the failure when forming the actuator plate 411 to increase the yield ratio of the inkjet head chip 41, the inkjet head 4, and the printer 1.

2. Modified Example

Then, a modified example of the embodiment described above will be described. It should be noted that substantially the same constituents as those in the embodiment are denoted by the same reference symbols, and the description thereof will arbitrarily be omitted.

Figure 14:
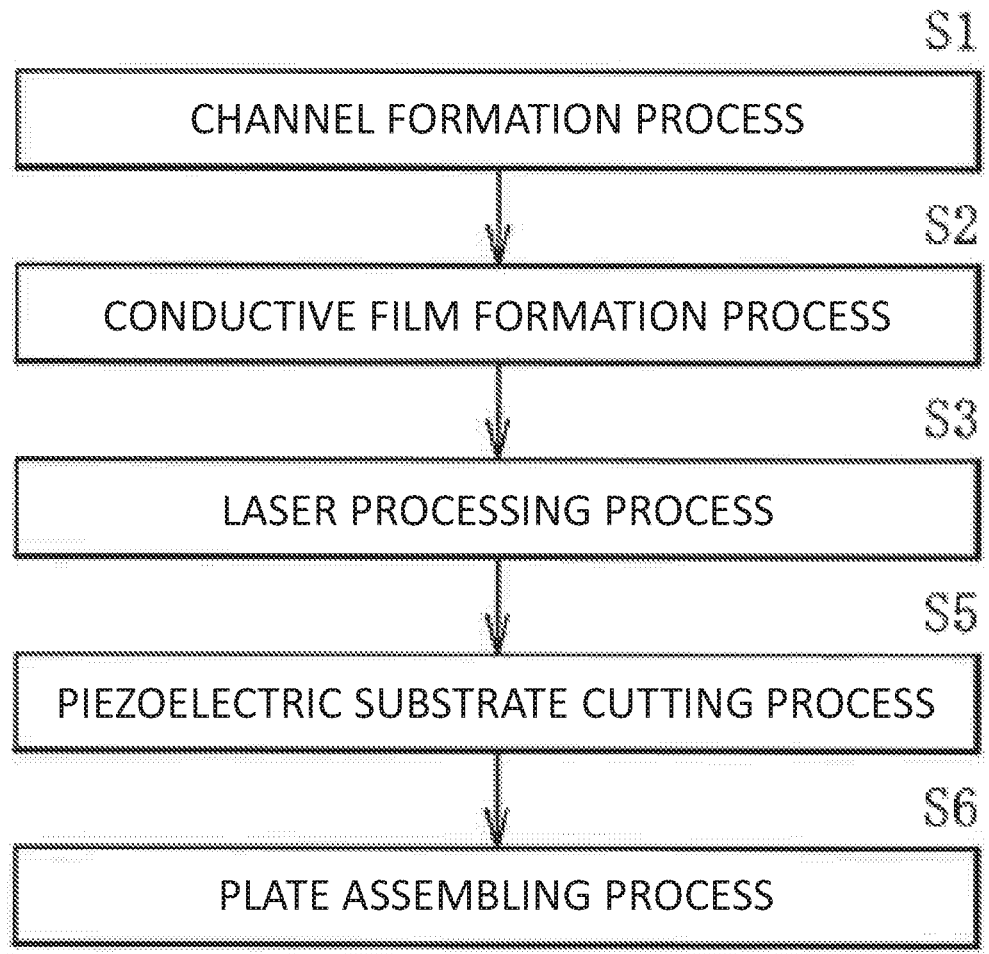
FIG. 14 is a flowchart showing an example of a method of manufacturing a liquid jet head according to a modified example.

FIG. 14 is a process chart showing a method of manufacturing the inkjet head 4 according to the modified example. In the embodiment described above, there is described the method of forming the common electrode pads Pc and the active electrode pads Pa using the laser processing and the surface removal processing. In contrast, in the method of manufacturing the inkjet head 4 shown in FIG. 14, the common electrode pads Pc and the active electrode pads Pa are formed without using the surface removal processing. Except this point, the method of manufacturing the inkjet head 4 according to the modified example is the same as the method of manufacturing the inkjet head 4 described in the above embodiment, and can exert substantially the same advantages as those of the method of manufacturing the inkjet head 4 described in the above embodiment.

In the method of manufacturing the inkjet head 4 according to the modified example, firstly, the step S1 and the step S2 are performed in sequence similarly to the description in the above embodiment. Subsequently, the laser processing is performed (step S3) on the surface of the piezoelectric substrate 411Z on which the conductive film F has been formed. In the laser processing, for example, the surface of the piezoelectric substrate 411Z is irradiated with the ultraviolet light similarly to the description in the above embodiment.

Figure 15:
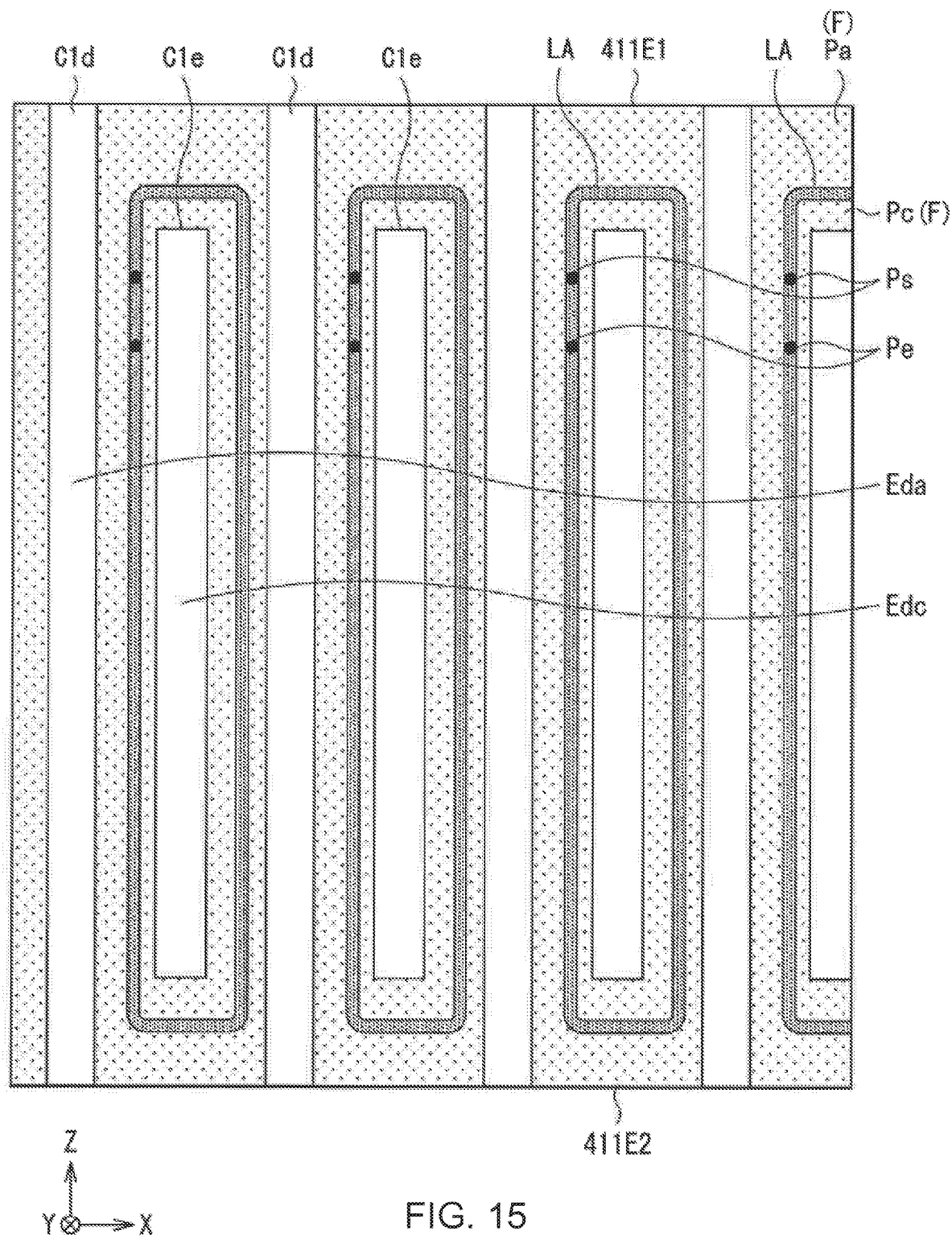
FIG. 15 is a schematic plan view for explaining an example of a process of the step S3 shown in FIG. 14.

FIG. 15 is a plan view showing an example of the configuration of the laser processing areas LA provided to the conductive film F by the laser processing. In the laser processing process, the laser processing area LA is formed so as to surround each of the ejection channels C1e. By forming the laser processing areas LA surrounding the respective ejection channels C1e, the conductive film F inside the laser processing area LA and the conductive film F outside the laser processing area LA are electrically separated from each other. The conductive film F inside the laser processing area LA is electrically coupled to the common electrode Edc, and the conductive film F outside the laser processing area LA is electrically coupled to the active electrode Eda. In other words, the common electrode pad Pc is formed of the conductive film F inside the laser processing area LA, and the active electrode pad Pa is formed of the conductive film F outside the laser processing area LA. The planar (in the X-Z plane in FIG. 12) shape of the laser processing area LA is, for example, a roughly rectangular shape or a roughly elliptical shape, but can also be another shape.

Here, the start point Ps and the end point Pe of the laser processing are set to positions different from each other. Thus, it is possible to suppress the deposition of the debris to increase the yield ratio. Hereinafter, the functions and the advantages will be described.

For example, it is also possible to form the laser processing area LA surrounding the ejection channel C1e by performing the laser processing on the surface of the piezoelectric substrate 411Z from the start point Ps on the periphery of the ejection channel C1e to the start point Ps so as to make the circuit of the periphery of the ejection channel C1e. On this occasion, the start point Ps and the end point Pe of the laser processing are disposed at the same position on the surface of the piezoelectric substrate 411Z. As described above, the debris is apt to be deposited at the start point Ps and the end point Pe of the laser processing. Therefore, when such start point Ps and end point Pe are disposed at the same position, the leakage of the ink 9 due to the deposition of the debris becomes apt to occur.

In contrast, in the present modified example, the laser processing area LA surrounding the ejection channel C1e is formed in, for example, the following manner. The laser processing is performed from the start point Ps on the periphery of the ejection channel C1e so as to pass between the ejection channel C1e and the dummy channel C1d, return to the start point Ps again after making the circuit of the periphery of the ejection channel C1e, then further trace, from the start point Ps, a part of the area (the laser processing area. LA) where the laser processing has once been performed, and reach the end point Pe set to a different position from the position of the start point Ps. By performing the laser processing in such a manner, the laser processing area LA surrounding the ejection channel C1e is formed, and at the same time, on the surface of the piezoelectric substrate 411Z, the start point Ps and the end point Pe are arranged at the respective positions shifted from each other. Therefore, it becomes possible to suppress the deposition of the debris to increase the yield ratio compared to the case of disposing the start point Ps and the end point Pe at the same position.

Here, the "laser processing performed from the start point Ps on the periphery of the ejection channel C1e so as to pass between the ejection channel C1e and the dummy channel C1d, and return to the start point Ps again after making the circuit of the periphery of the ejection channel C1e" described above corresponds to a specific example of "first laser processing" in the present disclosure, and the "laser processing performed so as to further trace, from the start point Ps, a part of the area (the laser processing area LA) where the laser processing (the first laser processing) has once been performed, and reach the end point Pe set to a different position from the position of the start point Ps" corresponds to a specific example of "second laser processing" in the present disclosure. The first laser processing can also be performed from the start point Ps so as to surround the ejection channel C1e to return to a point other than the start point Ps. It is also possible to arrange that the second laser processing is performed up to the end position Pe set in a part where the first laser processing is not performed after the first laser processing is performed so as to surround the ejection channel C1e.

Further, it is also possible to arrange that a plurality of laser processing areas LA surrounding each of the ejection channels C1e is formed. Thus, an unnecessary conductive film F between the ejection channel C1e and the dummy channel C1d adjacent to each other is more effectively removed similarly to the description in the above embodiment (see FIG. 11A through FIG. 11C). Therefore, it is possible to suppress the increase in current amount due to the unnecessary conductive film F to reduce the power consumption. Further, it is possible to ensure the necessary current amount for driving to perform the stable ejection.

After forming the common electrode pads Pc and the active electrode pads Pa in such a manner, the piezoelectric substrate 411Z is cut (step S5) to complete the actuator plate 411. Subsequently, assembling of the actuator plate 411 and other plates (e.g., the cover plate 410 and the nozzle plate 412) is performed (step S6). Thus, the inkjet head 4 is completed.

It is also possible to form the common pads Pc and the active electrode pads Pa without using the surface removal processing as described above. Also in this case, it becomes possible to suppress the occurrence of the failure when forming the actuator plate 411 to improve the yield ratio of the inkjet head chip 41, the inkjet head 4, and the printer 1 similarly to the description in the above embodiment.

Further, in the present modified example, the surface removal process (the step S4 in FIG. 6) with, for example, the dicer becomes unnecessary, and it is possible to form the common electrode pads Pc and the active electrode pads Pa only with the laser processing process (the step S3 in FIG. 14). In other words, a device for the surface removal process becomes unnecessary, and it becomes possible to suppress the device cost.

3. Other Modified Examples

The present disclosure is described hereinabove citing the embodiment and the modified example, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer 1 and the inkjet head 4, but what is described in the above embodiment and so on is not a limitation, and it is possible to adopt other shapes, arrangements, numbers and so on. Further, the values or the ranges, the magnitude relation and so on of a variety of parameters described in the above embodiment and so on are not limited to those described in the above embodiment and so on, but can also be other values or ranges, other magnitude relation and so on.

For example, the liquid jet head is not limited to the edge-shoot type liquid jet head described above, but can also be a side-shoot type liquid jet head. In the side-shoot type liquid jet head, in the case in which the channels provided to the actuator plate extend in a specific direction, the ink is jetted in a direction crossing the extending direction of the channels from each of the nozzle holes provided to the nozzle plate.

Further, for example, the liquid jet head can be a circulation type liquid jet head in which the ink 9 is circulated by a circulation mechanism between the inkjet head 4 and the ink tank 3, or can also be a non-circulation type liquid jet head.

Further, in the embodiment and so on described above, there is described the case in which the channels C1 are the grooves having the recessed shape in the cross-sectional view, but it is also possible for the channels C1 to be disposed so as to penetrate the actuator plate 411 in the thickness direction.

Further, in the embodiment and so on described above, there is described the case of forming the drive electrodes Ed in the channels C1 and the conductive film F on the surface of the piezoelectric substrate 411Z at the same time, but it is also possible to arrange that these are formed in respective processes different from each other. For example, it is possible to arrange that the drive electrodes Ed are formed using the oblique vapor deposition method, and then the oblique vapor deposition method is further performed to form the conductive film F.

Further, for example, it is also possible to arrange that a wiping mechanism having a function of removing the ink 9 adhering to the nozzle surface of the nozzle holes H2 further disposed inside the printer 1.

Further, in the above embodiment, there is described the case of applying the head chip and the liquid jet head in the present disclosure to the printer 1 (the inkjet printer), but this example is not a limitation, and it is also possible to apply the present disclosure to other devices than the inkjet printer. In other words, it is also possible to arrange that the "head chip" (the inkjet head chip 41) and the "liquid jet head" (the inkjet head 4) of the present disclosure are applied to other devices than the inkjet printer. Specifically, it is also possible to arrange that the "head chip" and the "liquid jet head" of the present disclosure are applied to a device such as a facsimile or an on-demand printer.

Further, it is also possible to apply the variety of examples described hereinabove in arbitrary combination.

It should be noted that the advantages described in the specification are illustrative only but are not a limitation, and other advantages can also be provided.

Further, the present disclosure can also take the following configurations.

<1>

A method of manufacturing a head chip having an actuator plate adapted to apply pressure to liquid so as to jet the liquid, the method comprising forming the actuator plate, the forming the actuator plate including forming a plurality of grooves on a surface of a piezoelectric substrate having one end and the other end so as to extend from the one end side toward the other end side; forming a conductive film on the surface of the piezoelectric substrate provided with the plurality of grooves; forming a laser processing area in the conductive film between the grooves adjacent to each other by performing laser processing from a start point on the one end side of the piezoelectric substrate to an end point on the other end side of the piezoelectric substrate; and forming a surface removal area in at least a part including the start point and the end point out of the surface of the piezoelectric substrate by performing surface removal processing in a direction crossing the direction in which the laser processing is performed.

<2>

The method of manufacturing the head chip according to <1>, wherein in the forming the laser processing area, a plurality of the laser processing areas is formed in the conductive film between the grooves adjacent to each other.

<3>

The method of manufacturing the head chip according to <2>, wherein the plurality of the laser processing areas includes a first laser processing area to be formed between the grooves adjacent to each other; a second laser processing area to be formed between the first laser processing area and one of the grooves adjacent to each other after forming the first laser processing area; and a third laser processing area to be formed between the second laser processing area and the first laser processing area after forming the second laser processing area.

<4>

The method of manufacturing the head chip according to any one of <1> to <3>, wherein the laser processing is performed using ultraviolet light.

<5>

The method of manufacturing the head chip according to any one of <1> to <4>, wherein the surface removal processing is performed using a dicer.

<6>

The method of manufacturing the head chip according to any one of <1> to <5>, further comprising bonding a nozzle plate provided with a nozzle hole communicated with at least one of the plurality of grooves to the actuator plate.

<7>

A method of manufacturing a head chip having an actuator plate adapted to apply pressure to liquid so as to jet the liquid, the method comprising forming the actuator plate, the forming actuator plate including providing, to a surface of a piezoelectric substrate having one end and the other end, a plurality of first grooves so as to extend from the one end side toward the other end side and a second groove which is disposed between the first grooves adjacent to each other and is shorter than the first grooves; forming a conductive film on the surface of the piezoelectric substrate provided with the plurality of first grooves and the second groove; and forming a laser processing area in the conductive film on a periphery of the second groove, by performing first laser processing from a start point on the periphery of the second groove so as to pass between one of the first grooves and the second groove and surround the second groove, and then performing second laser processing to an end point different from the start point.

<8>

The method of manufacturing the head chip according to <7>, wherein in the forming the laser processing area, a plurality of the laser processing areas is formed in the conductive film on the periphery of the second groove.

<9>

The method of manufacturing the head chip according to <7> or <8>, wherein the first laser processing and the second laser processing are performed using ultraviolet light.

The method of manufacturing the head chip according to any one of <7> to <9>, further comprising bonding a nozzle plate provided with a nozzle hole communicated with the second groove to the actuator plate.

A method of manufacturing a liquid jet head, comprising the method of manufacturing the head chip according to any one of <1> to <10>.

What is claimed is:

1. A method of manufacturing a head chip having an actuator plate adapted to apply pressure to liquid so as to jet the liquid, the method comprising forming the actuator plate, the forming the actuator plate including:

forming a plurality of grooves on a surface of a piezoelectric substrate having one end and the other end so as to extend from the one end side toward the other end side;

forming a conductive film on the surface of the piezoelectric substrate provided with the plurality of grooves;

forming a laser processing area in the conductive film between the grooves adjacent to each other by performing laser processing from a start point on the one end side of the piezoelectric substrate to an end point on the other end side of the piezoelectric substrate; and forming a surface removal area in at least a part including a start point and an end point of the laser processing by performing surface removal processing in a direction crossing the direction in which the laser processing is performed.

2. The method of manufacturing the head chip according to claim 1, wherein in the forming the laser processing area, a plurality of the laser processing areas is formed in the conductive film between the grooves adjacent to each other.

3. The method of manufacturing the head chip according to claim 2, wherein the plurality of the laser processing areas includes:

a first laser processing area to be formed between the grooves adjacent to each other;

a second laser processing area to be formed between the first laser processing area and one of the grooves adjacent to each other after forming the first laser processing area; and a third laser processing area to be formed between the second laser processing area and the first laser processing area after forming the second laser processing area.

4. The method of manufacturing the head chip according to claim 1, wherein the laser processing is performed using ultraviolet light.

5. The method of manufacturing the head chip according to claim 1, wherein the surface removal processing is performed using a dicer.

6. The method of manufacturing the head chip according to claim 1, further comprising bonding a nozzle plate provided with a nozzle hole communicated with at least one of the plurality of grooves to the actuator plate.

7. A method of manufacturing a head chip having an actuator plate adapted to apply pressure to liquid so as to jet the liquid, the method comprising forming the actuator plate, the forming actuator plate including:

providing, to a surface of a piezoelectric substrate having one end and the other end, a plurality of first grooves so as to extend from the one end side toward the other end side, and a second groove which is disposed between the first grooves adjacent to each other and is shorter than the first grooves;

forming a conductive film on the surface of the piezoelectric substrate provided with the plurality of first grooves and the second groove; and forming a laser processing area in the conductive film on a periphery of the second groove, by performing first laser processing from a start point on the periphery of the second groove so as to pass between one of the first grooves and the second groove and surround the second groove, and then performing second laser processing to an end point different from the start point.

8. The method of manufacturing the head chip according to claim 7, wherein in the forming the laser processing area, a plurality of the laser processing areas is formed in the conductive film on the periphery of the second groove.

9. The method of manufacturing the head chip according to claim 7, wherein the first laser processing and the second laser processing are performed using ultraviolet light.

10. The method of manufacturing the head chip according to claim 7, further comprising bonding a nozzle plate provided with a nozzle hole communicated with the second groove to the actuator plate.

11. A method of manufacturing a liquid jet head, comprising the method of manufacturing the head chip according to claim 1.

12. A method of manufacturing a liquid jet head, comprising the method of manufacturing the head chip according to claim 7.

* * * * *